US012735085B2

(12) United States Patent
Muller et al.

(10) Patent No.: US 12,735,085 B2
(45) Date of Patent: Sep. 15, 2026

(54) OMNIDIRECTIONAL BIASING ELEMENTS FOR A BATTERY COUPLING IN A MATERIALS HANDLING VEHICLE, AND MATERIALS HANDLING VEHICLES INCORPORATING THE SAME

(71) Applicant: Crown Equipment Corporation, New Bremen, OH (US)

(72) Inventors: Roland Muller, Feldkirchen (DE); Mingzhi Ma, Jiangsu (CN)

(73) Assignee: Crown Equipment Corporation, New Bremen, OH (US)

( * ) Notice: Subject to any disclaimer, the term of this patent is extended or adjusted under 35 U.S.C. 154(b) by 454 days.

(21) Appl. No.: 18/460,202

(22) Filed: Sep. 1, 2023

(65) Prior Publication Data

US 2025/0018991 A1 Jan. 16, 2025

Related U.S. Application Data

(63) Continuation of application No. PCT/CN2023/106992, filed on Jul. 12, 2023.

(51) Int. Cl.
*B62B 5/00* (2006.01)
*B62B 3/02* (2006.01)
(Continued)

(52) U.S. Cl.
CPC .............. *B62B 5/0053* (2013.01); *B62B 3/02* (2013.01); *B62B 3/0612* (2013.01); *B62B 3/0643* (2013.01); *H01R 13/635* (2013.01)

(58) Field of Classification Search
CPC ....................... B60K 1/04; B60L 53/16; B66F 9/07531–0754; H01R 13/428; H01R 13/432; H01R 4/48–489
See application file for complete search history.

(56) References Cited

U.S. PATENT DOCUMENTS 2,904,771 A 9/1959 Burtt et al.
2,917,722 A 12/1959 Cobbett et al.
(Continued)

FOREIGN PATENT DOCUMENTS

CN 1316120 A 5/2007
CN 206585121 U 10/2017
(Continued)

OTHER PUBLICATIONS

International Search Report and Written Opinion dated Dec. 23, 2023 pertaining to PCT/CN2023/106992 filed Jul. 12, 2023, pp. 1-8.
(Continued)

*Primary Examiner* — Tyrone V Hall, Jr.
(74) *Attorney, Agent, or Firm* — Dinsmore & Shohl LLP

(57) ABSTRACT

A materials handling vehicle including a battery receiving space and a removable battery assembly, wherein: the removable battery assembly and the battery receiving space define an axis; the removable battery assembly comprises a battery-side connector assembly and a vehicle-side connector assembly, each configured to electrically couple the removable battery assembly and an electrical system of the materials handling vehicle; the battery-side and vehicle-side connector assemblies each comprises a connector housing and an electrical coupler; the respective electrical coupler of each connector assembly are configured to couple together electrically; the electrical coupler of the battery-side connector assembly or the vehicle-side connector assembly is an omnidirectional biasing coupler, wherein the omnidirectional biasing coupler comprises an omnidirectional biasing element which secures the omnidirectional biasing coupler against the respective connector housing of the omnidirectional biasing coupler.

24 Claims, 14 Drawing Sheets

(51) Int. Cl.
*B62B 3/06* (2006.01)
*H01R 13/635* (2006.01)

(56) References Cited

U.S. PATENT DOCUMENTS

| | | | | |
|---|---|---|---|---|
| 3,564,709 | A | 2/1971 | Hickton | |
| 5,344,330 | A | 9/1994 | Hoffman | |
| 6,500,028 | B1 | 12/2002 | Higuchi | |
| 2019/0322508 | A1* | 10/2019 | Lili | B62B 5/0053 |
| 2021/0344132 | A1* | 11/2021 | Pavlovic | H01R 4/48 |

FOREIGN PATENT DOCUMENTS

| | | | |
|---|---|---|---|
| CN | 211929775 | U | 11/2020 |
| CN | 215364724 | U | 12/2021 |
| CN | 106134005 | A | 2/2022 |
| CN | 116001546 | A | 4/2023 |
| EP | 2822105 | A1 | 1/2015 |
| EP | 4223688 | A2 | 8/2023 |
| WO | 9948172 | A1 | 9/1999 |
| WO | 2015105840 | A1 | 7/2015 |

OTHER PUBLICATIONS

EV Connectors Face Special Design Challenges, Jul. 29, 2015, Arrow.com, https://www.arrow.com/en/research-and-events/articles/high-voltage-ev-connectors-face-special-design-challenges-v1.

* cited by examiner 200
220
135

100
210
130

500
502
506
504

510
520
550
555
515
540
530
560
535
606
525
602

610
620
604
650
655
615
630
635
660
600
625

700

750
755
730
726
724
720
722
710
740
800
850
855
830
826
824
820
822
810

840

900
940
943
941
942
930
980
992
991
993
990
920
923
921
922
910
960
972
971
973
970
950
944
934
982
983

943
942
940
990
992
993
945
995
900
950
925
200
130
975
230
132
923
922
920
970
972
973

1200

1230
1222
1228
1330
1224
1222
1220
1210
1240
1300
1330
1322
1328
1324
1326
1320
1310

1340

900
1440
1433
1480
1491
1492
1483
1490
1420
1413
1470
950
1463

1440
1442
1492
1490
1445
1425
900
200
230
1495
1475
950
130
132
1420
1422
1472
1470

OMNIDIRECTIONAL BIASING ELEMENTS FOR A BATTERY COUPLING IN A MATERIALS HANDLING VEHICLE, AND MATERIALS HANDLING VEHICLES INCORPORATING THE SAME

CROSS-REFERENCE TO RELATED APPLICATIONS

This application is a bypass continuation application of International Patent Application No. PCT/CN2023/106992 filed Jul. 12, 2023, the entire disclosure of which is hereby incorporated herein by reference.

BACKGROUND

Although the concepts of the present disclosure are described herein with primary reference to electric pallet trucks where the drive motor of the pallet truck is integrated with the hub of the pallet truck's single drive wheel, it is contemplated that particular concepts of the present disclosure will enjoy applicability to pallet trucks with other types of motor configurations, to other types of battery-powered materials handling vehicles including, for example, forklift trucks, tuggers, etc., or to other battery-powered vehicles, devices, or related electrically powered systems.

SUMMARY

In accordance with the present disclosure, an object of the invention can be seen in providing an improved materials handling vehicle as well as an improved removable battery assembly.

A first embodiment of the present disclosure relates to a materials handling vehicle. The materials handling vehicle may comprise a materials handling mechanism, a drive mechanism, a battery receiving space, and/or a removable battery assembly. The materials handling mechanism may be configured to engage goods in a warehouse environment and may cooperate with the drive mechanism, under power from the removable battery assembly, to move goods along an inventory transit surface in the warehouse environment. The removable battery assembly and the battery receiving space may cooperate to define a battery insertion and removal axis along which the removable battery assembly may be inserted into and removed from the battery receiving space. The removable battery assembly may comprise a battery-side connector assembly. The battery receiving space may comprise a vehicle-side connector assembly. The battery-side connector assembly and the vehicle-side connector assembly may be configured to electrically couple the removable battery assembly and an electrical system of the materials handling vehicle. The battery-side connector assembly and the vehicle-side connector assembly may each comprise a connector housing and an electrical coupler corresponding to and secured within the connector housing. The respective electrical coupler of the battery-side connector assembly and the respective electrical coupler of the vehicle-side connector assembly may be configured to couple together electrically as a result of relative movement along a coupler pairing axis that is parallel to the battery insertion and removal axis. At least one of the electrical coupler of the battery-side connector assembly or the electrical coupler of the vehicle-side connector assembly, or both, may be an omnidirectional biasing coupler, wherein the omnidirectional biasing coupler may comprise an omnidirectional biasing element. The omnidirectional biasing element may secure the omnidirectional biasing coupler against the respective connector housing of the the battery-side connector assembly or the vehicle-side connector assembly to limit axial movement of the omnidirectional biasing coupler relative to the respective connector housing of the the battery-side connector assembly or the vehicle-side connector assembly in a decoupling direction along the pairing axis. The omnidirectional biasing element may secure the omnidirectional biasing coupler against the respective connector housing of the the battery-side connector assembly or the vehicle-side connector assembly to permit omnidirectional spring-loaded deflection of the omnidirectional biasing coupler between a resting position and a spring-loaded deflected position.

A second embodiment of the present disclosure relates to a materials handling vehicle. The materials handling vehicle may comprise a materials handling mechanism, a drive mechanism, a battery receiving space, and/or a removable battery assembly. The materials handling mechanism may be configured to engage goods in a warehouse environment and may cooperate with the drive mechanism, under power from the removable battery assembly, to move goods along an inventory transit surface in the warehouse environment. The removable battery assembly and the battery receiving space may cooperate to define a battery insertion and removal axis along which the removable battery assembly may be inserted into and removed from the battery receiving space. The removable battery assembly may comprise a battery-side connector assembly. The battery receiving space may comprise a vehicle-side connector assembly. The battery-side connector assembly and the vehicle-side connector assembly may be configured to electrically couple the removable battery assembly and an electrical system of the materials handling vehicle. The battery-side connector assembly and the vehicle-side connector assembly may each comprise a connector housing and an electrical coupler corresponding to and secured within the connector housing. The respective electrical coupler of the battery-side connector assembly and the respective electrical coupler of the vehicle-side connector assembly may be configured to couple together electrically as a result of relative movement along a coupler pairing axis that is parallel to the battery insertion and removal axis. At least one of the electrical coupler of the battery-side connector assembly or the electrical coupler of the vehicle-side connector assembly, or both, may be an omnidirectional biasing coupler, wherein the omnidirectional biasing coupler may comprise an omnidirectional biasing element.

A third embodiment of the present disclosure relates to a materials handling vehicle. The materials handling vehicle may comprise a materials handling mechanism, a drive mechanism, and/or a battery receiving space. The materials handling mechanism may be configured to engage goods in a warehouse environment and may cooperate with the drive mechanism to move goods along an inventory transit surface in the warehouse environment. The battery receiving space may define a battery insertion and removal axis along which a removable battery assembly may be inserted into and removed from the battery receiving space. The battery receiving space may comprise a vehicle-side connector assembly. The vehicle-side connector assembly may be configured to electrically couple the removable battery assembly and an electrical system of the materials handling vehicle. The vehicle-side connector assembly may each comprise a connector housing and an electrical coupler corresponding to and secured within the connector housing. The electrical coupler of the vehicle-side connector assembly may be configured to couple together electrically with a connector assembly of the removable battery assembly as a result of relative movement along a coupler pairing axis that is parallel to the battery insertion and removal axis. The electrical coupler of the vehicle-side connector assembly may be an omnidirectional biasing coupler, wherein the omnidirectional biasing coupler may comprise an omnidirectional biasing element. The omnidirectional biasing element may secure the omnidirectional biasing coupler against the connector housing of the the battery-side connector assembly or the vehicle-side connector assembly to limit axial movement of the omnidirectional biasing coupler relative to the connector housing of the the battery-side connector assembly or the vehicle-side connector assembly in a decoupling direction along the pairing axis. The omnidirectional biasing element may secure the omnidirectional biasing coupler against the connector housing of the the battery-side connector assembly or the vehicle-side connector assembly to permit omnidirectional spring-loaded deflection of the omnidirectional biasing coupler between a resting position and a spring-loaded deflected position.

A fourth embodiment of the present disclosure relates to a materials handling vehicle. The materials handling vehicle may comprise a materials handling mechanism, a drive mechanism, and/or a battery receiving space. The materials handling mechanism may be configured to engage goods in a warehouse environment and may cooperate with the drive mechanism to move goods along an inventory transit surface in the warehouse environment. The battery receiving space may define a battery insertion and removal axis along which a removable battery assembly may be inserted into and removed from the battery receiving space. The battery receiving space may comprise a vehicle-side connector assembly. The vehicle-side connector assembly may be configured to electrically couple the removable battery assembly and an electrical system of the materials handling vehicle. The vehicle-side connector assembly may each comprise a connector housing and an electrical coupler corresponding to and secured within the connector housing. The electrical coupler of the vehicle-side connector assembly may be configured to couple together electrically with a connector assembly of the removable battery assembly as a result of relative movement along a coupler pairing axis that is parallel to the battery insertion and removal axis. The electrical coupler of the vehicle-side connector assembly may be an omnidirectional biasing coupler, wherein the omnidirectional biasing coupler may comprise an omnidirectional biasing element.

In any one of the embodiments disclosed herein, the resting position may form a resting angle between the pairing axis and the omnidirectional biasing coupler. The spring-loaded deflected position may be one of a plurality of angled spring-loaded deflected positions. Each of the angled spring-loaded deflected positions may form one of a plurality of deflected angles between the pairing axis and the battery-side electrical coupler, the vehicle-side electrical coupler, or both. Each deflected angle of the plurality of deflected angles may be greater than the resting angle.

In any one of the embodiments disclosed herein, the omnidirectional biasing element may be a flexible skirt.

In any of the embodiments disclosed herein, the omnidirectional biasing element may be disposed around a circumference of the elongate body of the omnidirectional biasing coupler. The omnidirectional biasing element may extend outwardly to an outer end.

In any one of the embodiments disclosed herein, the respective housing of the the battery-side connector assembly or the vehicle-side connector assembly may comprise a housing space. The housing space may comprise a housing wall.

In any one of the embodiments disclosed herein, when the omnidirectional biasing coupler is in a spring-loaded deflected position, an outer end of the omnidirectional biasing coupler may be configured to impart upon the omnidirectional biasing coupler a restorative force. The restorative force may bias the omnidirectional biasing coupler. The restorative force may bias the omnidirectional biasing coupler toward the resting position of the omnidirectional biasing coupler.

In any one of the embodiments disclosed herein, when the omnidirectional biasing coupler is in the spring-loaded deflected position, an outer end of the omnidirectional biasing coupler may be configured to, when in contact with a housing wall of a housing space of the respective housing of the the battery-side connector assembly or the vehicle-side connector assembly, impart upon the omnidirectional biasing coupler a restorative force. The restorative force may bias the omnidirectional biasing coupler. The restorative force may bias the omnidirectional biasing coupler toward the resting position of the omnidirectional biasing coupler.

In any one of the embodiments described herein, the respective housing of the the battery-side connector assembly or the vehicle-side connector assembly may comprise a housing space, the housing space may comprise a housing wall, the housing wall may comprise an inner shoulder, an outer end of the omnidirectional biasing element may be configured to limit axial movement of the omnidirectional biasing coupler, and the outer end of the omnidirectional biasing element may be configured to limit axial movement of the omnidirectional biasing coupler relative to the respective housing of the the battery-side connector assembly or the vehicle-side connector assembly in a decoupling direction along the pairing axis by contacting the inner shoulder.

In any one of the embodiments described herein, an inner shoulder of a housing wall of a housing space of the the battery-side connector assembly or the vehicle-side connector assembly may define a shoulder diameter. An outer end of the omnidirectional biasing element may define an outer end diameter. The outer end diameter may be greater than or equal to the shoulder diameter.

In any one of the embodiments described herein, the electrical coupler of the vehicle-side connector assembly may be a plug coupler or a socket coupler.

In any one of the embodiments described herein, the electrical coupler of the battery-side connector assembly may be a socket coupler or a plug coupler.

In any one of the embodiments described herein, the electrical coupler of the battery-side connector may be a plug coupler and the electrical coupler of the vehicle side connector assembly may be a socket coupler. Alternatively, in any one of the embodiments described herein, the electrical coupler of the battery-side connector may be a socket coupler and the electrical coupler of the vehicle side connector assembly may be a plug coupler.

In any one of the embodiments described herein, the electrical coupler of the vehicle-side connector assembly may be a plug coupler, the electrical coupler of the battery-side connector assembly may be a socket coupler, and the socket coupler may be configured to receive the plug coupler.

In any one of the embodiments described herein, an outer end of the omnidirectional biasing element may extend continuously or discontinuously about the circumference of the elongate body of the omnidirectional biasing coupler.

In any one of the embodiments described herein, an outer end of the omnidirectional biasing element may comprise at least one gap, may be non-uniform, may be slotted, or may comprise a combination of these characteristics.

In any one of the embodiments described herein, the omnidirectional biasing element may be disposed around a circumference of the elongate body of the omnidirectional biasing coupler, the omnidirectional biasing element may extend outwardly to an outer end, and the outer end of the omnidirectional biasing element may extend continuously about the circumference of the elongate body of the omnidirectional biasing coupler, extend discontinuously about the circumference of the elongate body, comprise at least one gap, be non-uniform, and/or be slotted.

In any one of the embodiments described herein, at least one of the electrical coupler of the vehicle-side connector assembly and the electrical coupler of the battery-side connector assembly may be a plug coupler or a socket coupler.

In any one of the embodiments described herein, at least one of the electrical coupler of the vehicle-side connector assembly and the electrical coupler of the battery-side connector assembly may be a socket coupler. The connector housing of the battery-side connector assembly or the connector housing of the vehicle-side connector assembly may comprise a housing space. The housing space may comprise a housing wall. The housing wall may comprise an outer lip. The outer lip may extend around a distal end of a socket of the socket coupler. The outer lip may be configured to guide a corresponding one of the electrical couplers into the socket. The outer lip may be configured to guide the electrical coupler of the battery-side connector assembly or the electrical coupler of the vehicle-side connector assembly into the socket.

In any one of the embodiments described herein, the connector housing of the battery-side connector assembly or the connector housing of the vehicle-side connector assembly may comprise a housing space. The housing space may comprise a housing wall. The housing wall may comprise an outer lip. The outer lip may extend around a distal end of the electrical coupler of the vehicle-side connector assembly. The outer lip may be configured to guide the electrical coupler of the battery-side connector assembly. The outer lip may be configured to guide the electrical coupler of the battery-side connector assembly toward the electrical coupler of the vehicle-side connector assembly.

In any one of the embodiments described herein, the connector housing of the battery-side connector assembly or the connector housing of the battery-side connector assembly may comprise a housing space. The housing space may comprise a housing wall. The housing wall may comprise an outer lip. The outer lip may extend around a distal end of the electrical coupler of the battery-side connector assembly. The outer lip may be configured to guide the electrical coupler of the vehicle-side connector assembly. The outer lip may be configured to guide the electrical coupler of the vehicle-side connector assembly toward the electrical coupler of the battery-side connector assembly.

In any one of the embodiments described herein, the omnidirectional biasing coupler may be a plug coupler or a socket coupler.

In any one of the embodiments described herein, the battery-side connector assembly may comprise a plurality of battery-side electrical couplers. The vehicle-side connector assembly may comprise a plurality of vehicle-side electrical couplers. Each of the battery-side electrical couplers may correspond to a corresponding vehicle-side electrical coupler of the plurality of vehicle-side electrical couplers. Each battery-side electrical coupler and corresponding vehicle-side electrical coupler may form a coupler pair. Each coupler pair may be configured to couple along a respective pairing axis that is parallel to the battery insertion and removal axis.

In any one of the embodiments described herein, the omnidirectional biasing coupler may comprise an elongate body. The omnidirectional biasing coupler may comprise a flexible o-ring. The flexible o-ring may be disposed about the elongate body.

In any one of the embodiments described herein, the respective connector housing of the the battery-side connector assembly or the vehicle-side connector assembly may comprise a housing space. The housing space may comprise a housing wall. A flexible o-ring may be disposed about an elongate body of the omnidirectional biasing coupler. The flexible o-ring may be configured to provide a frictional force. The flexible o-ring may be configured to, when in contact with the housing wall, provide a frictional force. The frictional force may limit axial movement of the omnidirectional biasing coupler. The frictional force may limit axial movement of the omnidirectional biasing coupler relative to the respective connector housing of the the battery-side connector assembly or the vehicle-side connector assembly. The frictional force may limit axial movement of the omnidirectional biasing coupler relative to the respective connector housing of the the battery-side connector assembly or the vehicle-side connector assembly in a decoupling direction along the pairing axis.

In any one of the embodiments described herein, an elongate body of the omnidirectional biasing coupler may comprise a ring-housing groove. The ring-housing groove may house a flexible o-ring.

In any one of the embodiments described herein, the respective connector housing of the the battery-side connector assembly or the vehicle-side connector assembly may comprise a housing space. The housing space may comprise a housing wall. A flexible o-ring disposed about an elongate body of the omnidirectional biasing coupler may create a seal between the elongate body and the housing wall.

In any one of the embodiments described herein, the electrical coupler of the battery-side connector assembly, the electrical coupler of the vehicle-side connector assembly, or both may comprise an inner end. The inner end may be electrically coupled to a conductor.

In any one of the embodiments described herein, the electrical coupler of the battery-side connector assembly, the electrical coupler of the vehicle-side connector assembly, or both may be a power coupler or a control coupler.

In any one of the embodiments described herein, the omnidirectional biasing coupler may be a power coupler or a control coupler.

In any one of the embodiments described herein, the battery-side connector assembly may comprise a battery-side omnidirectional biasing element. The battery-side omnidirectional biasing element may secure the electrical coupler of the battery-side connector assembly to the connector housing of the battery-side connector assembly. The battery-side omnidirectional biasing element may secure the electrical coupler of the battery-side connector assembly to the connector housing of the battery-side connector assembly to limit axial movement of the electrical coupler of the battery-side connector assembly relative to the connector housing of the battery-side connector assembly in a decoupling direction along the pairing axis. The battery-side omnidirectional biasing element may secure the electrical coupler of the battery-side connector assembly to the connector housing of the battery-side connector assembly to permit omnidirectional spring-loaded deflection of the electrical coupler of the battery-side connector assembly between a battery-side resting position and a spring-loaded battery-side deflected position. The battery-side omnidirectional biasing element may secure the electrical coupler of the battery-side connector assembly to the connector housing of the battery-side connector assembly to limit axial movement of the electrical coupler of the battery-side connector assembly relative to the connector housing of the battery-side connector assembly in a decoupling direction along the pairing axis and permit omnidirectional spring-loaded deflection of the electrical coupler of the battery-side connector assembly between a battery-side resting position and a spring-loaded battery-side deflected position.

In any one of the embodiments described herein, the vehicle-side connector assembly may comprise a vehicle-side omnidirectional biasing element. The vehicle-side omnidirectional biasing element may secure the electrical coupler of the vehicle-side connector assembly to the connector housing of the vehicle-side connector assembly. The vehicle-side omnidirectional biasing element may secure the electrical coupler of the vehicle-side connector assembly to the connector housing of the vehicle-side connector assembly to limit axial movement of the electrical coupler of the vehicle-side connector assembly relative to the connector housing of the vehicle-side connector assembly in a decoupling direction along the pairing axis. The vehicle-side omnidirectional biasing element may secure the electrical coupler of the vehicle-side connector assembly to the connector housing of the vehicle-side connector assembly to permit omnidirectional spring-loaded deflection of the electrical coupler of the vehicle-side connector assembly between a vehicle-side resting position and a spring-loaded vehicle-side deflected position. The vehicle-side omnidirectional biasing element may secure the electrical coupler of the vehicle-side connector assembly to the connector housing of the vehicle-side connector assembly to limit axial movement of the electrical coupler of the vehicle-side connector assembly relative to the connector housing of the vehicle-side connector assembly in a decoupling direction along the pairing axis and permit omnidirectional spring-loaded deflection of the electrical coupler of the vehicle-side connector assembly between a vehicle-side resting position and a spring-loaded vehicle-side deflected position.

In any one of the embodiments described herein, the battery-side connector assembly may comprise a battery-side omnidirectional biasing element, the battery-side omnidirectional biasing element may secure the electrical coupler of the battery-side connector assembly to the connector housing of the battery-side connector assembly to: limit axial movement of the electrical coupler of the battery-side connector assembly relative to the connector housing of the battery-side connector assembly in a decoupling direction along the pairing axis, and permit omnidirectional spring-loaded deflection of the electrical coupler of the battery-side connector assembly between a battery-side resting position and a spring-loaded battery-side deflected position, the vehicle-side connector assembly may comprise a vehicle-side omnidirectional biasing element, and the vehicle-side omnidirectional biasing element may secure the electrical coupler of the vehicle-side connector assembly to the connector housing of the vehicle-side connector assembly to limit axial movement of the electrical coupler of the vehicle-side connector assembly relative to the connector housing of the vehicle-side connector assembly in a decoupling direction along the pairing axis and permit omnidirectional spring-loaded deflection of the electrical coupler of the vehicle-side connector assembly between a vehicle-side resting position and a spring-loaded vehicle-side deflected position. The battery-side resting position may form a battery-side resting angle between the pairing axis and the electrical coupler of the battery-side connector assembly. The spring-loaded battery-side deflected position may be one of a plurality of angled spring-loaded battery-side deflected positions. The spring-loaded battery-side deflected position may be one of a plurality of angled spring-loaded battery-side deflected positions, wherein each of the angled spring-loaded battery-side deflected positions forms one of a plurality of battery-side deflected angles between the pairing axis and the electrical coupler of the battery-side connector assembly. The spring-loaded battery-side deflected position may be one of a plurality of angled spring-loaded battery-side deflected positions, wherein each battery-side deflected angle of a plurality of battery-side deflected angles is greater than the battery-side resting angle. The spring-loaded battery-side deflected position may be one of a plurality of angled spring-loaded battery-side deflected positions, wherein each of the angled spring-loaded battery-side deflected positions forms one of a plurality of battery-side deflected angles between the pairing axis and the electrical coupler of the battery-side connector assembly and each battery-side deflected angle of the plurality of battery-side deflected angles is greater than the battery-side resting angle. The vehicle-side omnidirectional biasing element may secure the electrical coupler of the vehicle-side connector assembly to the connector housing of the vehicle-side connector assembly to limit axial movement of the electrical coupler of the vehicle-side connector assembly relative to the connector housing of the vehicle-side connector assembly in a decoupling direction along the pairing axis and permit omnidirectional spring-loaded deflection of the electrical coupler of the vehicle-side connector assembly between a vehicle-side resting position and a spring-loaded vehicle-side deflected position.

In any one of the embodiments described herein, the battery-side connector assembly may comprise a battery-side omnidirectional biasing element. The battery-side omnidirectional biasing element may secure the electrical coupler of the battery-side connector assembly to the connector housing of the battery-side connector assembly. The battery-side omnidirectional biasing element may secure the electrical coupler of the battery-side connector assembly to the connector housing of the battery-side connector assembly to limit axial movement of the electrical coupler of the battery-side connector assembly relative to the connector housing of the battery-side connector assembly in a decoupling direction along the pairing axis and permit omnidirectional spring-loaded deflection of the electrical coupler of the battery-side connector assembly between a battery-side resting position and a spring-loaded battery-side deflected position. The vehicle-side connector assembly may comprise a vehicle-side omnidirectional biasing element. The vehicle-side omnidirectional biasing element may secure the electrical coupler of the vehicle-side connector assembly to the connector housing of the vehicle-side connector assembly to: limit axial movement of the electrical coupler of the vehicle-side connector assembly relative to the connector housing of the vehicle-side connector assembly in a decoupling direction along the pairing axis, and permit omnidirectional spring-loaded deflection of the electrical coupler of the vehicle-side connector assembly between a vehicle-side resting position and a spring-loaded vehicle-side deflected position. The vehicle-side resting position may form a vehicle-side resting angle between the pairing axis and the electrical coupler of the vehicle-side connector assembly. The spring-loaded vehicle-side deflected position may be one of a plurality of angled spring-loaded vehicle-side deflected positions. The spring-loaded vehicle-side deflected position may be one of a plurality of angled spring-loaded vehicle-side deflected positions, wherein each of the angled spring-loaded vehicle-side deflected positions forms one of a plurality of vehicle-side deflected angles between the pairing axis and the electrical coupler of the vehicle-side connector assembly. The spring-loaded vehicle-side deflected position may be one of a plurality of angled spring-loaded vehicle-side deflected positions, wherein each vehicle-side deflected angle of a plurality of vehicle-side deflected angles is greater than the vehicle-side resting angle. The spring-loaded vehicle-side deflected position may be one of a plurality of angled spring-loaded vehicle-side deflected positions, wherein each of the angled spring-loaded vehicle-side deflected positions forms one of a plurality of vehicle-side deflected angles between the pairing axis and the electrical coupler of the vehicle-side connector assembly and each vehicle-side deflected angle of the plurality of vehicle-side deflected angles is greater than the vehicle-side resting angle.

In any one of the embodiments described herein, permitting omnidirectional spring-loaded deflection of the omnidirectional biasing coupler between the resting position and the spring-loaded deflected position may comprise permitting a spring-loaded deflective force directed toward the pairing axis. The spring-loaded deflective force may be directed toward the pairing axis at a deflective angle substantially aligned with a radial angle of the resting position relative to the pairing axis. The radial angle may be any radial angle relative to the pairing axis. The deflective angle may be an angle within 30 degrees of the radial angle of the resting position, within 25 degrees of the radial angle of the resting position, within 20 degrees of the radial angle of the resting position, within 15 degrees of the radial angle of the resting position, within 10 degrees of the radial angle of the resting position, or within 5 degrees of the radial angle of the resting position.

A fifth embodiment of the present disclosure relates to a materials handling vehicle. The materials handling vehicle may comprise a materials handling mechanism, a drive mechanism, a battery receiving space, and a removable battery assembly. The materials handling mechanism may be configured to engage goods in a warehouse environment and may cooperate with the drive mechanism, under power from the removable battery assembly, to move goods along an inventory transit surface in the warehouse environment. The removable battery assembly and the battery receiving space may cooperate to define a battery insertion and removal axis along which the removable battery assembly may be inserted into and removed from the battery receiving space. The removable battery assembly may comprise a battery-side connector assembly. The battery receiving space may comprise a vehicle-side connector assembly. The battery-side connector assembly and the vehicle-side connector assembly may be configured to electrically couple the removable battery assembly and an electrical system of the materials handling vehicle. The battery-side connector assembly and the vehicle-side connector assembly may each comprise a connector housing and an electrical coupler corresponding to and secured within the connector housing. The respective electrical coupler of the battery-side connector assembly and the respective electrical coupler of the vehicle-side connector assembly may be configured to couple together electrically as a result of relative movement along a coupler pairing axis that is parallel to the battery insertion and removal axis. At least one of the electrical coupler of the battery-side connector assembly or the electrical coupler of the vehicle-side connector assembly, or both, may be a bidirectional biasing coupler, wherein the bidirectional biasing coupler may comprise an bidirectional biasing element. The bidirectional biasing element may secure the bidirectional biasing coupler against the respective connector housing of the bidirectional biasing coupler to: limit axial movement of the bidirectional biasing coupler relative to the respective connector housing of the bidirectional biasing coupler in a decoupling direction along the pairing axis, and permit bidirectional spring-loaded deflection of the bidirectional biasing coupler between a resting position and a spring-loaded deflected position.

A sixth embodiment of the present disclosure relates to a materials handling vehicle. The materials handling vehicle may comprise a materials handling mechanism, a drive mechanism, a battery receiving space, and a removable battery assembly. The materials handling mechanism may be configured to engage goods in a warehouse environment and may cooperate with the drive mechanism, under power from the removable battery assembly, to move goods along an inventory transit surface in the warehouse environment. The removable battery assembly and the battery receiving space may cooperate to define a battery insertion and removal axis along which the removable battery assembly may be inserted into and removed from the battery receiving space. The removable battery assembly may comprise a battery-side connector assembly. The battery receiving space may comprise a vehicle-side connector assembly. The battery-side connector assembly and the vehicle-side connector assembly may be configured to electrically couple the removable battery assembly and an electrical system of the materials handling vehicle. The battery-side connector assembly and the vehicle-side connector assembly may each comprise a connector housing and an electrical coupler corresponding to and secured within the connector housing. The respective electrical coupler of the battery-side connector assembly and the respective electrical coupler of the vehicle-side connector assembly may be configured to couple together electrically as a result of relative movement along a coupler pairing axis that is parallel to the battery insertion and removal axis. At least one of the electrical coupler of the battery-side connector assembly or the electrical coupler of the vehicle-side connector assembly, or both, may be a bidirectional biasing coupler, wherein the bidirectional biasing coupler may comprise an bidirectional biasing element.

A seventh embodiment of the present disclosure relates to a materials handling vehicle. The materials handling vehicle may comprise a materials handling mechanism, a drive mechanism, and a battery receiving space. The materials handling mechanism may be configured to engage goods in a warehouse environment and may cooperate with the drive mechanism to move goods along an inventory transit surface in the warehouse environment. The battery receiving space may define a battery insertion and removal axis along which a removable battery assembly may be inserted into and removed from the battery receiving space. The battery receiving space may comprise a vehicle-side connector assembly. The vehicle-side connector assembly may be configured to electrically couple to a battery-side connector assembly of the removable battery assembly and an electrical system of the materials handling vehicle. The vehicle-side connector assembly may comprise a connector housing and an electrical coupler corresponding to and secured within the connector housing. The electrical coupler of the electrical coupler of the vehicle-side connector assembly may be configured to couple with an electrical coupler of the battery-side connector assembly electrically as a result of relative movement along a coupler pairing axis that is parallel to the battery insertion and removal axis. The electrical coupler of the vehicle-side connector assembly may be a bidirectional biasing coupler, wherein the bidirectional biasing coupler may comprise an bidirectional biasing element. The bidirectional biasing element may secure the bidirectional biasing coupler against the respective connector housing of the bidirectional biasing coupler to: limit axial movement of the bidirectional biasing coupler relative to the respective connector housing of the bidirectional biasing coupler in a decoupling direction along the pairing axis, and permit bidirectional spring-loaded deflection of the bidirectional biasing coupler between a resting position and a spring-loaded deflected position.

An eighth embodiment of the present disclosure relates to a materials handling vehicle. The materials handling vehicle may comprise a materials handling mechanism, a drive mechanism, and a battery receiving space. The materials handling mechanism may be configured to engage goods in a warehouse environment and may cooperate with the drive mechanism to move goods along an inventory transit surface in the warehouse environment. The battery receiving space may define a battery insertion and removal axis along which a removable battery assembly may be inserted into and removed from the battery receiving space. The battery receiving space may comprise a vehicle-side connector assembly. The vehicle-side connector assembly may be configured to electrically couple to a battery-side connector assembly of the removable battery assembly and an electrical system of the materials handling vehicle. The vehicle-side connector assembly may comprise a connector housing and an electrical coupler corresponding to and secured within the connector housing. The electrical coupler of the electrical coupler of the vehicle-side connector assembly may be configured to couple with an electrical coupler of the battery-side connector assembly electrically as a result of relative movement along a coupler pairing axis that is parallel to the battery insertion and removal axis. The electrical coupler of the vehicle-side connector assembly may be a bidirectional biasing coupler, wherein the bidirectional biasing coupler may comprise an bidirectional biasing element.

In any one of the embodiments described herein, the bidirectional biasing element may comprise at least two flanges.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange may extend outwardly to a second outer end.

In any one of the embodiments described herein, at least one of a first outer end of the bidirectional biasing element and a second outer end of the bidirectional biasing element extends continuously about a portion of a circumference of an elongate body of the bidirectional biasing coupler.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange may extend outwardly to a second outer end. At least one of the first outer end of the bidirectional biasing element and the second outer end of the bidirectional biasing element extends continuously about a portion of a circumference of the elongate body of the bidirectional biasing coupler.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange may extend outwardly to a second outer end. Either or both of the first outer end or the second outer end of the bidirectional biasing element may extend about up to 60 degrees of a circumference of the elongate body of the bidirectional biasing coupler, about up to 45 degrees of a circumference of the elongate body of the bidirectional biasing coupler, or about up to 30 degrees of a circumference of the elongate body of the bidirectional biasing coupler.

In any one of the embodiments described herein, an outer end of the bidirectional biasing element may extend about up to 60 degrees of a circumference of an elongate body of the bidirectional biasing coupler, about up to 45 degrees of a circumference of an elongate body of the bidirectional biasing coupler, or about up to 30 degrees of a circumference of an elongate body of the bidirectional biasing coupler.

In any one of the embodiments described herein, the electrical coupler of the battery-side connector assembly, the electrical coupler of the vehicle-side connector assembly, or both may be a control coupler or a power coupler.

In any one of the embodiments described herein, the bidirectional biasing coupler may be a control coupler or a power coupler.

In any one of the embodiments described herein, resting position may form a resting angle between the pairing axis and the bidirectional biasing coupler. The spring-loaded deflected position may be one of a plurality of angled spring-loaded deflected positions. The spring-loaded deflected position may be one of a plurality of angled spring-loaded deflected positions, wherein each of the angled spring-loaded deflected positions may form one of a plurality of deflected angles between the pairing axis and the battery-side electrical coupler, the vehicle-side electrical coupler, or both. The spring-loaded deflected position may be one of a plurality of angled spring-loaded deflected positions, wherein each deflected angle of a plurality of deflected angles may be greater than the resting angle. The spring-loaded deflected position may be one of a plurality of angled spring-loaded deflected positions, wherein each of the angled spring-loaded deflected positions may form one of a plurality of deflected angles between the pairing axis and the battery-side electrical coupler, the vehicle-side electrical coupler, or both and each deflected angle of the plurality of deflected angles may be greater than the resting angle.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange ma extend outwardly to a second outer end.

In any one of the embodiments described herein, the respective housing of the bidirectional biasing coupler may comprise a housing space. The housing space may comprise a housing wall. When the bidirectional biasing coupler is in the spring-loaded deflected position, a first outer end of a first flange of the bidirectional biasing element may be configured to, when in contact with the housing wall, impart upon the bidirectional biasing coupler a restorative force. When the bidirectional biasing coupler is in the spring-loaded deflected position, a second outer end of a second flange of the bidirectional biasing element may be configured to, when in contact with the housing wall, impart upon the bidirectional biasing coupler a restorative force. When the bidirectional biasing coupler is in the spring-loaded deflected position, the bidirectional biasing element may be configured to, when in contact with the housing wall, impart upon the bidirectional biasing coupler a restorative force. When the bidirectional biasing coupler is in the spring-loaded deflected position, a first outer end of a first flange of the bidirectional biasing element may be configured to impart upon the bidirectional biasing coupler a restorative force. When the bidirectional biasing coupler is in the spring-loaded deflected position, a second outer end of a second flange of the bidirectional biasing element may be configured to impart upon the bidirectional biasing coupler a restorative force. When the bidirectional biasing coupler is in the spring-loaded deflected position, the bidirectional biasing element may be configured to impart upon the bidirectional biasing coupler a restorative force. The restorative force may bias the bidirectional biasing coupler. The restorative force may bias the bidirectional biasing coupler toward the resting position of the bidirectional biasing coupler.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange may extend outwardly to a second outer end. The housing space may comprise a housing wall. When the bidirectional biasing coupler is in the spring-loaded deflected position, the first outer end may be configured to, when in contact with the housing wall, impart upon the bidirectional biasing coupler a restorative force. When the bidirectional biasing coupler is in the spring-loaded deflected position, the first outer end may be configured to impart upon the bidirectional biasing coupler a restorative force. When the bidirectional biasing coupler is in the spring-loaded deflected position, the second outer end may be configured to, when in contact with the housing wall, impart upon the bidirectional biasing coupler a restorative force. When the bidirectional biasing coupler is in the spring-loaded deflected position, the second outer end may be configured to impart upon the bidirectional biasing coupler a restorative force. When the bidirectional biasing coupler is in the spring-loaded deflected position, the bidirectional biasing element may be configured to impart upon the bidirectional biasing coupler a restorative force. The restorative force may bias the bidirectional biasing coupler. The restorative force may bias the bidirectional biasing coupler toward the resting position of the bidirectional biasing coupler.

In any one of the embodiments described herein, the respective housing of the bidirectional biasing coupler may comprise a housing space. The housing space may comprise a housing wall. The housing wall may comprise an inner shoulder. A first outer end of a first flange of the bidirectional biasing element may be configured to limit axial movement of the bidirectional biasing coupler relative to the respective housing of the bidirectional biasing coupler in a decoupling direction along the pairing axis by contacting the inner shoulder. A second outer end of a second flange of the bidirectional biasing element may be configured to limit axial movement of the bidirectional biasing coupler relative to the respective housing of the bidirectional biasing coupler in a decoupling direction along the pairing axis by contacting the inner shoulder.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange ma extend outwardly to a second outer end. The respective housing of the bidirectional biasing coupler may comprise a housing space. The housing space may comprise a housing wall. The housing wall may comprise an inner shoulder. The first outer end of the bidirectional biasing element may be configured to limit axial movement of the bidirectional biasing coupler relative to the respective housing of the bidirectional biasing coupler in a decoupling direction along the pairing axis by contacting the inner shoulder. The second outer end of the bidirectional biasing element may be configured to limit axial movement of the bidirectional biasing coupler relative to the respective housing of the bidirectional biasing coupler in a decoupling direction along the pairing axis by contacting the inner shoulder.

In any one of the embodiments described herein, the respective housing of the bidirectional biasing coupler may comprise a housing space, the housing space comprising a housing wall. The housing wall may comprise an inner shoulder. The inner shoulder of the housing wall may define a shoulder diameter. A first outer end of a first flange of the bidirectional biasing element and a second outer end of a second flange of the bidirectional biasing element may define an outer end diameter. The outer end diameter may be greater than or equal to the shoulder diameter.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange ma extend outwardly to a second outer end. The respective housing of the bidirectional biasing coupler may comprise a housing space, the housing space comprising a housing wall. The housing wall may comprise an inner shoulder. The inner shoulder of the housing wall may define a shoulder diameter. A first outer end of a first flange of the bidirectional biasing element and a second outer end of a second flange of the bidirectional biasing element may define an outer end diameter. The outer end diameter may be greater than or equal to the shoulder diameter.

In any one of the embodiments described herein, the electrical coupler of the vehicle-side connector assembly or of the battery-side connector assembly may be a plug coupler.

In any one of the embodiments described herein, the electrical coupler of the vehicle-side connector assembly or of the battery-side connector assembly may be a socket coupler.

In any one of the embodiments described herein, electrical coupler of the vehicle-side connector assembly may be a plug coupler, the electrical coupler of the battery-side connector assembly may be a socket coupler, and the socket coupler may be configured to receive the plug coupler.

In any one of the embodiments described herein, at least one of a first outer end of a first flange of the bidirectional biasing element and a second outer end of a second flange of the bidirectional biasing element may extend continuously about a portion of a circumference of an elongate body of the bidirectional biasing coupler. At least one of the first outer end of the bidirectional biasing element and the second outer end of the bidirectional biasing element may be non-uniform. At least one of the first outer end of the bidirectional biasing element and the second outer end of the bidirectional biasing element may be corrugated. At least one of the first outer end of the bidirectional biasing element and the second outer end of the bidirectional biasing element may be slotted. At least one of the first outer end of the bidirectional biasing element and the second outer end of the bidirectional biasing element may be wavy.

In any one of the embodiments described herein, the bidirectional biasing element may be disposed around an elongate body of the bidirectional biasing coupler. The bidirectional biasing element may comprise a first flange and a second flange. The first flange may extend outwardly to a first outer end. The second flange ma extend outwardly to a second outer end. The first outer end of the bidirectional biasing element and the second outer end of the bidirectional biasing element may extend continuously about a portion of a circumference of the elongate body of the bidirectional biasing coupler. At least one of the first outer end of the bidirectional biasing element and the second outer end of the bidirectional biasing element may be non-uniform. At least one of the first outer end of the bidirectional biasing element and the second outer end of the bidirectional biasing element may be corrugated. At least one of the first outer end of the bidirectional biasing element and the second outer end of the bidirectional biasing element may be slotted. At least one of the first outer end of the bidirectional biasing element and the second outer end of the bidirectional biasing element may be wavy.

In any one of the embodiments described herein, at least one of the electrical coupler of the vehicle-side connector assembly and the electrical coupler of the battery-side connector assembly may be a plug coupler.

In any one of the embodiments described herein, at least one of the electrical coupler of the vehicle-side connector assembly and the electrical coupler of the battery-side connector assembly may be a socket coupler.

In any one of the embodiments described herein, at least one of the electrical coupler of the vehicle-side connector assembly and the electrical coupler of the battery-side connector assembly may be a socket coupler. The connector housing of the battery-side connector assembly or the connector housing of the vehicle-side connector assembly may comprise a housing space, the housing space comprising a housing wall. The housing wall may comprise an outer lip, the outer lip extending around a distal end of a socket of the socket coupler. The outer lip may be configured to guide a corresponding one of the couplers into the socket.

In any one of the embodiments described herein, the bidirectional biasing coupler may be a plug coupler or a socket coupler.

In any one of the embodiments described herein, the battery-side connector assembly may comprise a plurality of battery-side electrical couplers. The vehicle-side connector assembly may comprise a plurality of vehicle-side electrical couplers. Each of the battery-side electrical couplers may correspond to a corresponding vehicle-side electrical coupler of the plurality of vehicle-side electrical couplers, each battery-side electrical coupler and corresponding vehicle-side electrical coupler forming a coupler pair. Each coupler pair may be configured to couple along a respective pairing axis that is parallel to the battery insertion and removal axis.

In any one of the embodiments described herein, the bidirectional biasing coupler may comprise an elongate body. The bidirectional biasing coupler may comprise a flexible o-ring disposed about the elongate body. The respective connector housing of the bidirectional biasing coupler may comprise a housing space, the housing space comprising a housing wall. The flexible o-ring may be configured to, when in contact with the housing wall, provide a frictional force that limits axial movement of the bidirectional biasing coupler relative to the respective connector housing of the bidirectional biasing coupler in a decoupling direction along the pairing axis. The elongate body may comprise a ring-housing groove. The ring-housing groove may house the flexible o-ring. The respective connector housing of the bidirectional biasing coupler may comprise a housing space, the housing space comprising a housing wall. The flexible o-ring may create a seal between the elongate body and the housing wall.

In any one of the embodiments described herein, the electrical coupler of the battery-side connector assembly, the electrical coupler of the vehicle-side connector assembly, or both may comprise an inner end. The inner end may be electrically coupled to a conductor.

In any one of the embodiments described herein, the electrical coupler of the battery-side connector assembly, the vehicle side electrical coupler, or both may be a power coupler.

In any one of the embodiments described herein, the electrical coupler of the battery-side connector assembly, the electrical coupler of the vehicle-side connector assembly, or both may be a control coupler.

In any one of the embodiments described herein, the bidirectional biasing coupler may be a power coupler or a control coupler.

In any one of the embodiments described herein, the battery-side connector assembly may comprise a battery-side bidirectional biasing element. The battery-side bidirectional biasing element may secure the electrical coupler of the battery-side connector assembly to the connector housing of the battery-side connector assembly to: limit axial movement of the electrical coupler of the battery-side connector assembly relative to the connector housing of the battery-side connector assembly in a decoupling direction along the pairing axis, and permit bidirectional spring-loaded deflection of the electrical coupler of the battery-side connector assembly between a battery-side resting position and a spring-loaded battery-side deflected position. The vehicle-side connector assembly may comprise a vehicle-side bidirectional biasing element. The vehicle-side bidirectional biasing element may secure the electrical coupler of the vehicle-side connector assembly to the connector housing of the vehicle-side connector assembly to: limit axial movement of the electrical coupler of the vehicle-side connector assembly relative to the connector housing of the vehicle-side connector assembly in a decoupling direction along the pairing axis, and permit bidirectional spring-loaded deflection of the electrical coupler of the vehicle-side connector assembly between a vehicle-side resting position and a spring-loaded vehicle-side deflected position. The battery-side resting position may form a battery-side resting angle between the pairing axis and the electrical coupler of the battery-side connector assembly. The spring-loaded battery-side deflected position may be one of a plurality of angled spring-loaded battery-side deflected positions, wherein: each of the angled spring-loaded battery-side deflected positions forms one of a plurality of battery-side deflected angles between the pairing axis and the electrical coupler of the battery-side connector assembly, and each battery-side deflected angle of the plurality of battery-side deflected angles is greater than the battery-side resting angle. The vehicle-side resting position may form a vehicle-side resting angle between the pairing axis and the electrical coupler of the vehicle-side connector assembly. The spring-loaded vehicle-side deflected position may be one of a plurality of angled spring-loaded vehicle-side deflected positions, wherein: each of the angled spring-loaded vehicle-side deflected positions forms one of a plurality of vehicle-side deflected angles between the pairing axis and the electrical coupler of the vehicle-side connector assembly, and each vehicle-side deflected angle of the plurality of vehicle-side deflected angles is greater than the vehicle-side resting angle.

In any one of the embodiments described herein, permitting bidirectional spring-loaded deflection of the bidirectional biasing coupler between the resting position and the spring-loaded deflected position may comprise permitting a spring-loaded deflective force directed toward the pairing axis at a deflective angle substantially aligned with a radial angle of the resting position relative to the pairing axis, wherein the radial angle may be any radial angle within a first range of angles relative to the pairing axis or within a second range of angles relative to the pairing axis, wherein the first range of angles and the second range of angles may be entirely discrete. The deflective angle may be an angle within 30 degrees of the radial angle of the resting position, within 25 degrees of the radial angle of the resting position, within 20 degrees of the radial angle of the resting position, within 15 degrees of the radial angle of the resting position, within 10 degrees of the radial angle of the resting position, or within 5 degrees of the radial angle of the resting position.

Embodiments and features from one aspect may be embodiments and features from another aspect. Additional features and advantages may be gleaned by the person skilled in the art from the following description of exemplary embodiments with respect to the appended figures. The embodiments as shown and described are exemplary embodiments only and shall not be construed as limiting the invention, which is defined by the appended claims.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
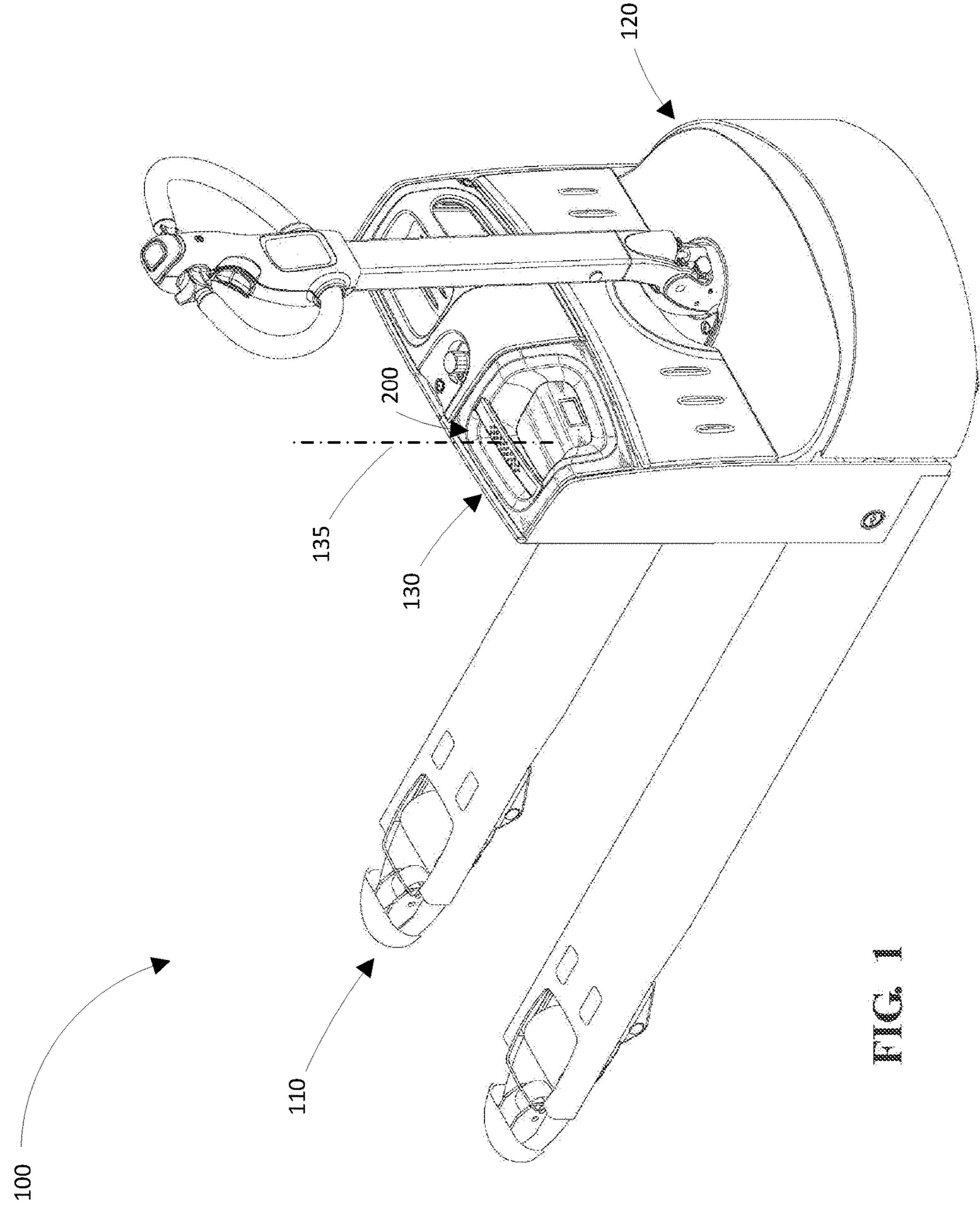
FIG. 1 schematically depicts a perspective view of a materials handling vehicle, according to one or more embodiments described herein.

Referring initially to FIG. 1, a materials handling vehicle 100 is shown. The materials handling vehicle 100 includes a materials handling mechanism 110, a drive mechanism 120, a battery receiving space 130, and a removable battery assembly 200. The materials handling mechanism 110 is configured to engage goods in a warehouse environment and cooperates with the drive mechanism 120, under power from the removable battery assembly 200, to move goods along an inventory transit surface in the warehouse environment.

For the purposes of defining and describing the concepts and scope of the present disclosure, it is noted that a "warehouse" encompasses any indoor or outdoor industrial facility in which materials handling vehicles transport goods including, but not limited to, indoor or outdoor industrial facilities that are intended primarily for the storage of goods, such as those where multi-level racks are arranged in aisles, and manufacturing facilities where goods are transported about the facility by materials handling vehicles for use in one or more manufacturing processes.

The drive mechanism 120 is merely illustrated schematically in FIG. 1, and it is noted that a variety of conventional and yet-to-be developed drive mechanisms will be suitable for operation with materials handling vehicles of the present disclosure. For example, and not by way of limitation, in the context of a pallet truck, the drive mechanism 120 may comprise an electric motor that is integrated with the steerable wheel of the pallet truck, as is disclosed in U.S. Pat. No. 6,343,907, and other similar patent literature.

The removable battery assembly 200 and the battery receiving space 130 cooperate to define a battery insertion and removal axis 135 along which the removable battery assembly 200 is inserted into and removed from the battery receiving space 130. It is noted that the present description and claims refer to movement of various components "along" respective axes. This movement "along" an axis encompasses movement that is directly co-linear with the associated axis and movement that is displaced from but parallel to the associated axis.

Figure 2:
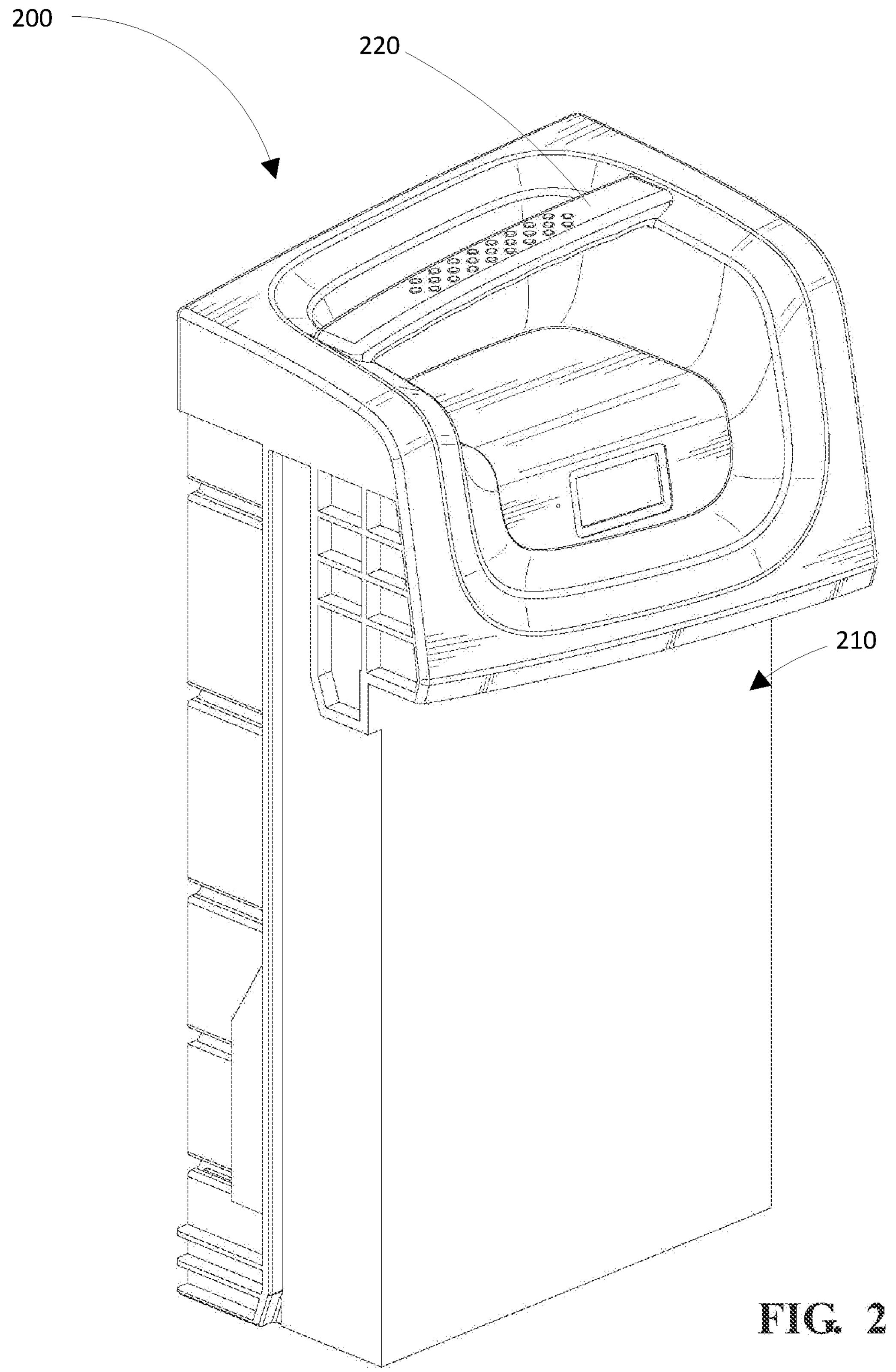
FIG. 2 schematically depicts a perspective view of a removable battery assembly of the materials handling vehicle of FIG. 1, according to one or more embodiments described herein.
Figure 3:
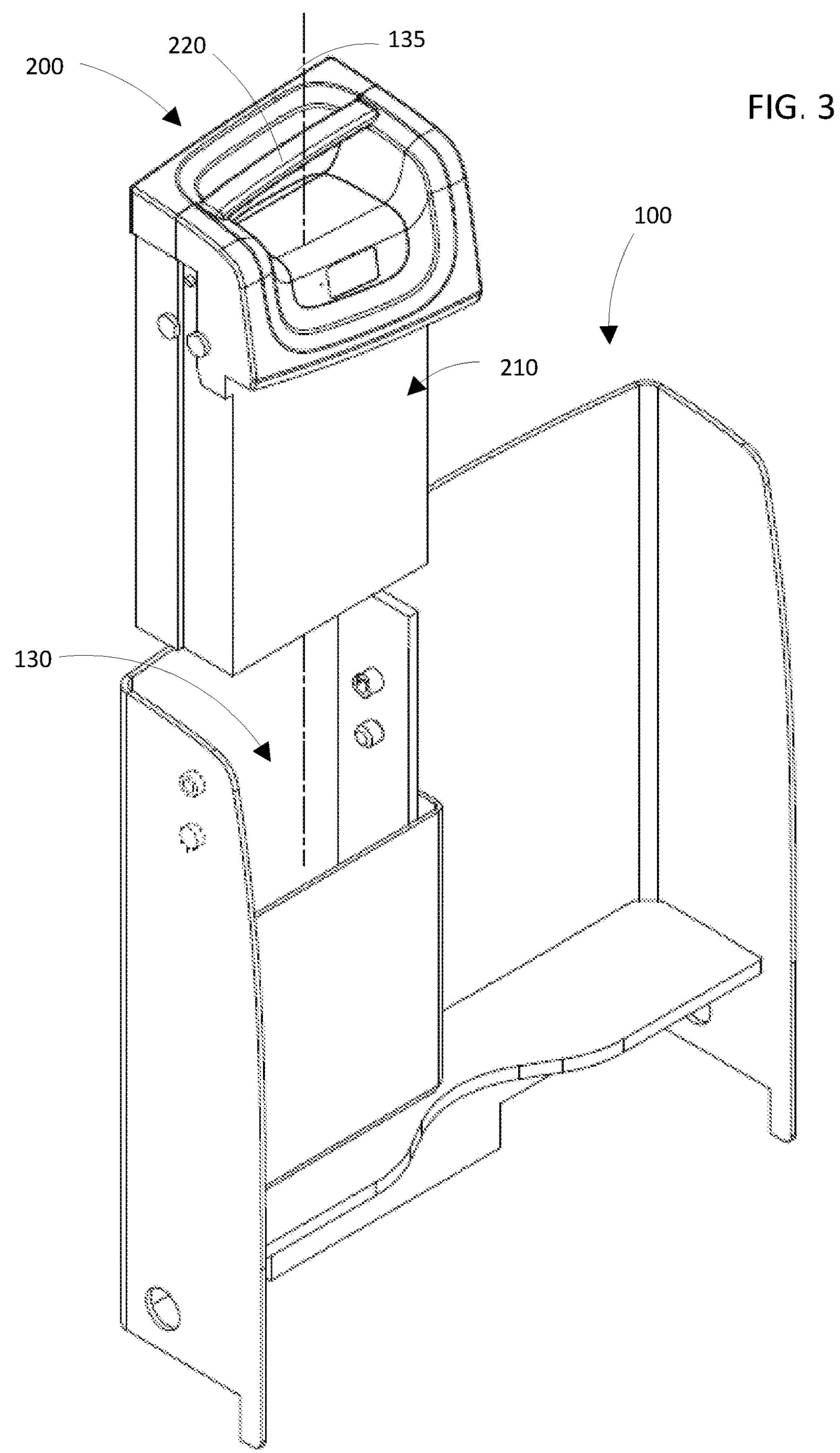
FIG. 3 schematically depicts a perspective view of the removable battery assembly of FIGS. 1-2 being inserted into a battery receiving space, according to one or more embodiments described herein.

Referring now to FIGS. 2-3, the removable battery assembly 200 comprises a battery body 210. The battery body 210 of the removable battery assembly 200 comprises a plurality of rechargeable battery cells (not pictured), and the battery body 210 contains the plurality of rechargeable battery cells therein. The battery assembly 200 further comprises a battery handle 220, and the battery handle 220 provides a mechanism by which a user may carry the removable battery assembly 200. A user may insert or remove the removable battery assembly 200 into or from the battery receiving space 130 by, e.g., using the battery handle 220 to move the battery assembly 200 along the battery insertion and removal axis 135. To power the drive mechanism 120, the removable battery assembly 200 must be electrically coupled to the materials handling vehicle 100. The removable battery assembly 200 couples with the materials handling vehicle 100 by placing the removable battery assembly 200 within the battery receiving space 130, and, when the removable battery assembly 200 is electrically coupled to the materials handling vehicle 100, the battery receiving space 130 houses the removable battery assembly 200.

Figure 4B:
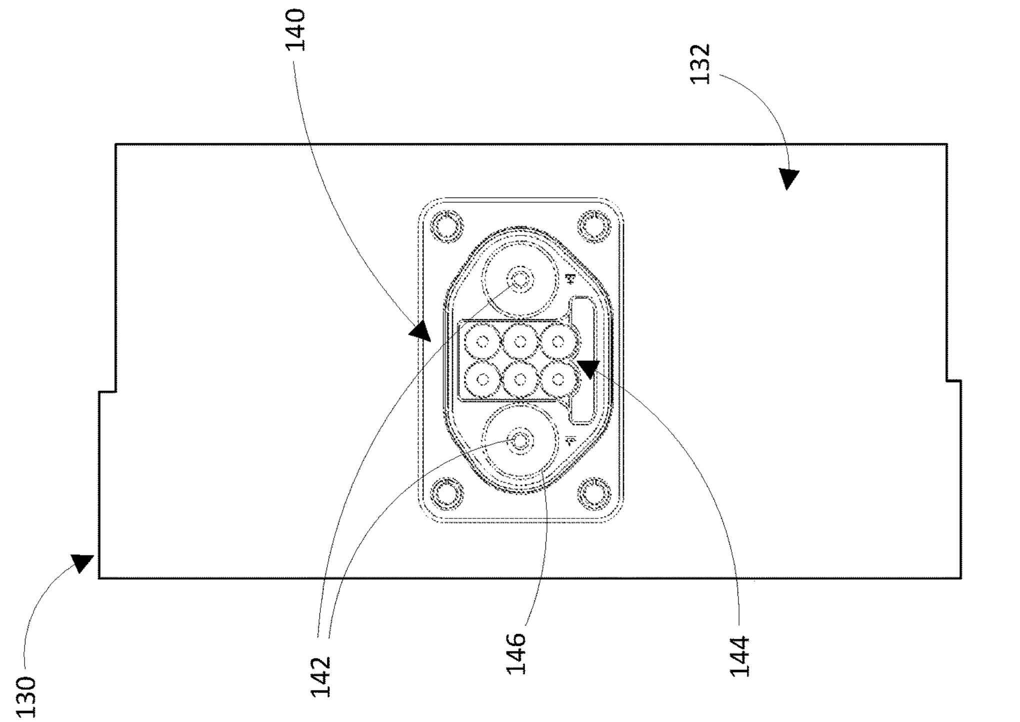
FIG. 4B schematically depicts an upward-facing side of the battery receiving space of FIG. 3, according to one or more embodiments described herein.
Figure 4A:
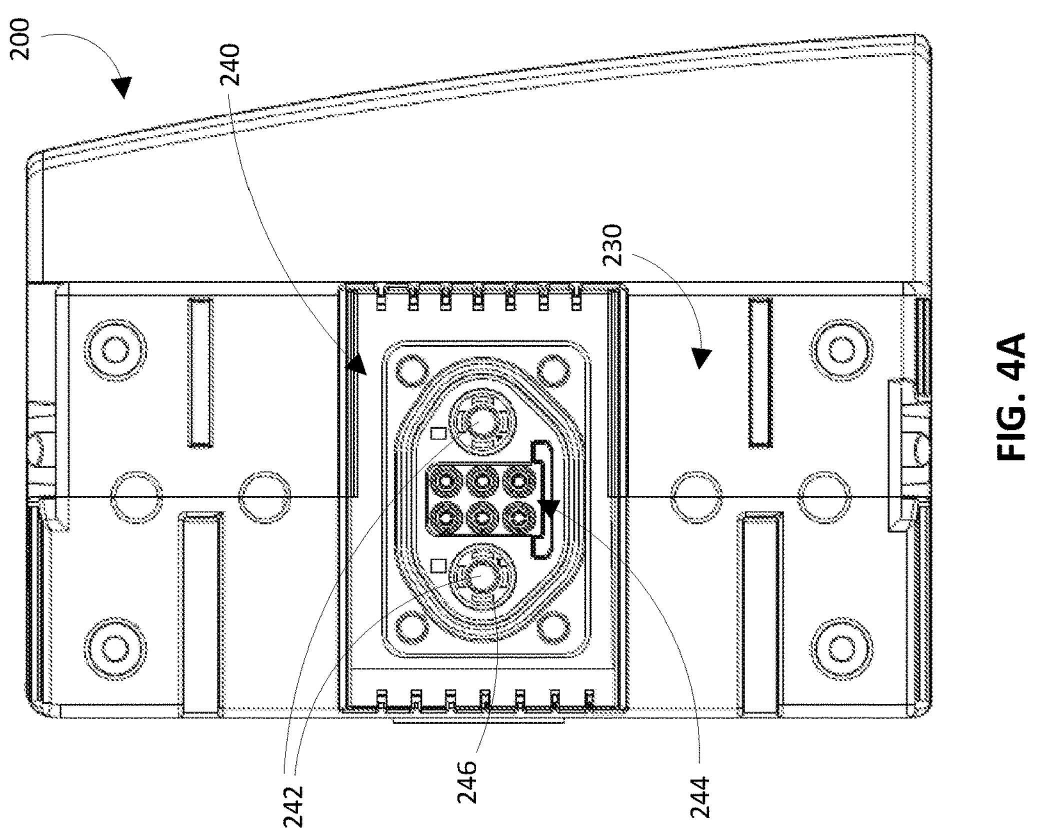
FIG. 4A schematically depicts a bottom side of the removable battery assembly of FIGS. 1-3, according to one or more embodiments described herein.

Referring now to FIGS. 4A-4B, a bottom face 230 of the removable battery assembly 200 and an upward-facing face 132 of the battery receiving space are depicted. The bottom face 230 is the side of the removable battery assembly 200 that faces the battery receiving space 130 and is perpendicular to the battery insertion and removal axis 135 as the removable battery assembly 200 is inserted into the battery receiving space 130 along the battery insertion and removal axis 135. Similarly, the upward-facing face 132 is the side of the battery receiving space 130 that faces the bottom face 230 of the removable battery assembly 200 and is perpendicular to the battery insertion and removal axis 135 as the removable battery assembly is inserted into the battery receiving space 130 along the battery insertion and removal axis 135. The bottom face 230 of the removable battery assembly 200 comprises a battery-side connector assembly 240, and the upward-facing face 132 of the battery receiving space 130 comprises a vehicle-side connector assembly 140 that complements the battery-side connector assembly 240 of the removable battery assembly 200. Through a coupling of the vehicle-side connector assembly 140 and the battery-side connector assembly 240, the removable battery assembly 200 and the materials handling vehicle 100 can engage in electrical communication, including delivering power from the removable battery assembly 200 to the materials handling vehicle 100.

The battery-side connector assembly 240 comprises battery-side electrical couplers 242, 244. Each of these battery-side electrical couplers 242, 244 are secured within a battery-side connector housing, such as the battery-side connector housing 246, which secures one of the battery-side electrical couplers 242. Similarly, the vehicle-side connector assembly 140 comprises vehicle-side electrical couplers 142, 144. Each of these vehicle-side electrical couplers 142, 144 are secured within a vehicle-side connector housing, such as the vehicle-side connector housing 146, which secures one of the vehicle-side electrical couplers 142.

The electrical couplers 142, 144, 242, 244 are configured to enable electrical communication between the connector assemblies 140, 240 and, by extension, similarly enable electrical communication between the removable battery assembly 200 and the materials handling vehicle 100. As will be described in further detail below, each of the electrical couplers 142, 144, 242, 244 contains, in an inner end (not depicted in FIGS. 4A-B; similar inner ends are described below and depicted in FIGS. 9-11 and 14-16), a conductor, which is electrically coupled to the respective one of the electrical couplers 142, 144, 242, 244. Within each of the battery-side electrical couplers 242, 244, the conductor is further electrically coupled to the interior of the battery-side connector assembly 240 and an electrical interface of the removable battery assembly 200. Within each of the vehicle-side couplers 142, 144, the conductor is further electrically coupled to the interior of the vehicle-side connector assembly 140 and an electrical interface of the materials handling vehicle 100.

In this embodiment, the electrical couplers 142, 242 are power couplers, and the electrical couplers 144, 244 are control couplers. The electrical couplers 142, 242, being power couplers, thereby provide the interface by which the removable battery assembly 200 delivers power to the materials handling vehicle 100, while the electrical couplers 144, 244, being control couplers, provide an interface for sending control or communication signals between the materials handling vehicle 100 and the removable battery assembly 200. In this embodiment, the connector assemblies 140, 240 each comprise two power couplers and six control couplers, although other embodiments may comprise differing numbers of each respective type of coupler and may comprise any number of each type of coupler. Further, other embodiments may only utilize a single type of coupler and may utilize any number of such couplers.

As will be described in further detail below, the battery-side connector assembly 240 and the vehicle-side connector assembly 140 are configured to correspond to one another such that the battery-side connector assembly 240 and the vehicle side connector assembly 140 electrically couple the removable battery assembly and an electrical system of the materials handling vehicle 100. In this embodiment, to couple the connector assemblies 140, 240, the connector assemblies 140, 240 are each differently configured such that one of the connector assemblies 140, 240 receives the other of the connector assemblies 140, 240. In some embodiments, such configurations of the connector assemblies 140, 240 comprise configuring either the vehicle-side electrical couplers 142, 144 or the battery-side electrical couplers 242, 244 to be plug couplers and configuring the other of the vehicle-side electrical couplers 142, 144 or the battery-side electrical couplers 242, 244 to be socket couplers. Socket couplers are configured to receive plug couplers, where, when electrically coupled together, a socket coupler houses, in a socket, a plug of the plug coupler.

In certain embodiments, the vehicle-side electrical couplers 142, 144 are plug couplers, while the battery-side electrical couplers 242, 244 are socket couplers. Other embodiments may utilize differing configurations and distributions of plug couplers and socket couplers, and, in some such embodiments, all of the vehicle-side couplers 142, 144 may not be the same configuration of coupler and all of the battery-side couplers 242, 244 may not be the same configuration of coupler, such that, e.g., some of the vehicle-side couplers 142, 144 are configured to be socket couplers, while others of the vehicle-side couplers 142, 144 are configured to be plug couplers.

Figures 5, 6:
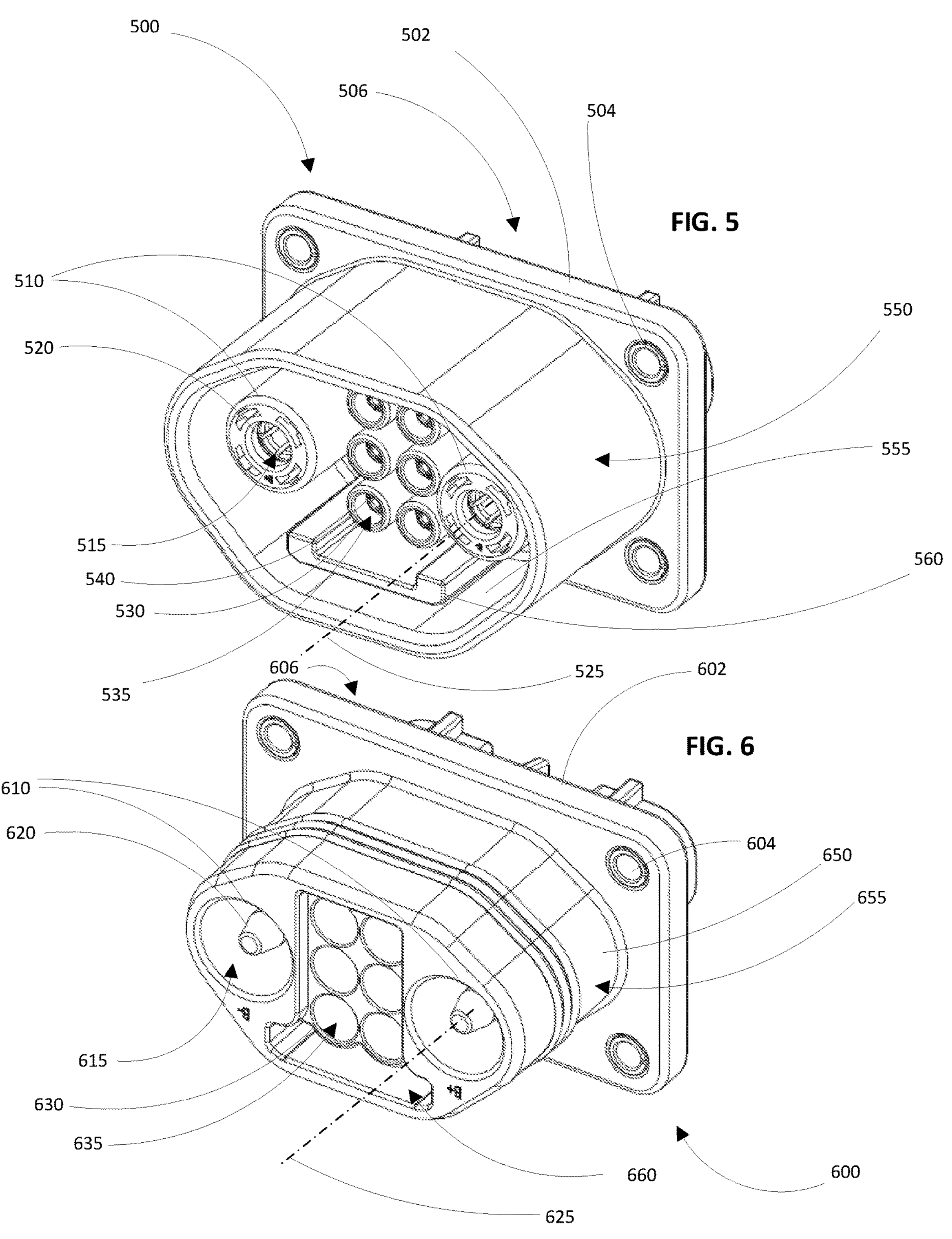
FIG. 5 schematically depicts a socket connector assembly, according to one or more embodiments described herein.
FIG. 6 schematically depicts a plug connector assembly, according to one or more embodiments described herein.

Referring now to FIGS. 5-6, a socket connector assembly 500 and a plug connector assembly 600 are depicted. The socket connector assembly 500 comprises power socket couplers 520 secured within power socket coupler housings 510, and control socket couplers 540 secured within control socket coupler housings 530. Each of the power socket coupler housings 510 define a power socket housing space 515, and each of the power socket couplers 520 is secured within a respective power socket housing space 515. Similarly, each of the control socket coupler housings 530 define a control socket housing space 535, and each of the control socket couplers 540 is secured within a respective control socket housing space 535. The socket connector assembly 500 further comprises a mounting surface 502, which may be affixed by fastening mechanisms 504 to, e.g., the bottom side 230 of the removable battery assembly 200 or to the upward-facing side 132 of the battery receiving space 130 of FIGS. 4A-B. A rear side 506 of the socket connector assembly 500 is configured to electrically couple with an electrical interface on a device such as, e.g. the removable battery assembly 200 or the materials handling vehicle 100. The socket couplers 520, 540 are each electrically coupled to conductors, and, when the socket connector assembly 500 is electrically coupled to an electrical interface, the conductors electrically couple each of the socket couplers 520, 540 to the electrical interface.

The plug connector assembly 600 comprises power plug couplers 620 secured within power plug coupler housings 610, and control plug couplers 640 (not depicted in FIG. 6; similar control plug couplers are depicted in FIGS. 12-16) secured within control plug coupler housings 630. Each of the power plug coupler housings 610 define a power plug housing space 615, and each of the power plug couplers 620 is secured within a respective power plug housing space 615. Similarly, each of the control plug coupler housings 630 define a control plug housing space 635, and each of the control plug couplers 640 is secured within a respective control plug housing space 635. The plug connector assembly 600 further comprises a mounting surface 602, which may be affixed by fastening mechanisms 604 to, e.g., the bottom side 230 of the removable battery assembly 200 or to the upward-facing side 132 of the battery receiving space 130 of FIGS. 4A-B. A rear side 606 of the plug connector assembly 600 is configured to electrically couple with an electrical interface on a device such as, e.g. the removable battery assembly 200 or the materials handling vehicle 100. The plug couplers 620, 640 are each electrically coupled to conductors, and, when the plug connector assembly 600 is electrically coupled to an electrical interface, the conductors electrically couple each of the plug couplers 620, 640 to the electrical interface.

The socket connector assembly 500 is thereby configured to correspond to the plug connector assembly 600, and the plug connector assembly 600 is similarly configured to correspond to the socket connector assembly 500, to establish an electrical coupling between the connector assemblies 500, 600. The power socket couplers 520 are configured to receive the power plug couplers 620, as the power socket couplers 520 are sized and shaped to correspond to a size and shape of the power plug couplers 620. Similarly, the control socket couplers 540 are configured to receive the control plug couplers 640, as the control socket couplers 540 are sized and shaped to correspond to a size and shape of the control plug couplers 640.

Each coupling of the power couplers 520, 620 and of the control couplers 540, 640 thereby forms a coupler pair aligned relative to each other along a pairing axis of the coupler pair. Each of the couplers 520, 540, 620, 640 comprises an individual coupler axis, such as a socket coupler axis 525 of one of the power socket couplers 520 and a plug coupler axis 625 of one of the power plug couplers 620. For the respective power socket coupler 520 of the socket coupler axis 525 to couple with the respective power plug coupler 620 of the plug coupler axis 625, forming a coupler pair of one of the power socket couplers 520 and a corresponding coupler of the power plug couplers 620, the coupler axes 525, 625 must be substantially aligned, forming a pairing axis shared by the coupler pair, and the corresponding couplers of the power couplers 520, 620 must move toward each other along the pairing axis.

To facilitate the coupling between the connector assemblies 500, 600, each corresponding pair of the power coupler housings 510, 610 are sized such that one of the power coupler housings 510, 610 receives the other of the power coupler housings 510, 610. In this embodiment, the power plug coupler housings 610 comprise a diameter that is greater than a diameter of the power socket coupler housings 510, such that, when the connector assemblies 500, 600 are coupled, the power plug coupler housings 610 receives the power socket coupler housings 510 such that the power plug coupler housings 610 surround a circumference of the power socket housings 510. Thereby, in this embodiment, when the connector assemblies 500, 600 are coupled, the power plug coupler housing 610 receives the power socket coupler housing 510 and, within the power coupler housings 510, 610, the power socket coupler 520 receives the power plug coupler 620. However, in other embodiments, the power coupler housings 510, 610 may be differently sized and shaped such that the power socket coupler housings 510 are instead configured to receive the power plug coupler housings 610.

To further facilitate the coupling between the connector assemblies 500, 600, each corresponding pair of the control coupler housings 530, 630 are sized such that one of the control coupler housings 530, 630 receives the other of the control coupler housings 530, 630. In this embodiment, the control plug coupler housings 630 comprise a diameter that is greater than a diameter of the control socket coupler housings 530, such that, when the connector assemblies 500, 600 are coupled, the control plug coupler housings 630 receives the control socket coupler housings 530 such that the control plug coupler housings 630 surround a circumference of the control socket housings 530. Thereby, in this embodiment, when the connector assemblies 500, 600 are coupled, the control plug coupler housing 630 receives the control socket coupler housing 530 and, within the control coupler housings 530, 630, the control socket coupler 540 receives the control plug coupler 640. However, in other embodiments, the control coupler housings 530, 630 may be differently sized and shaped such that the control socket coupler housings 530 are instead configured to receive the control plug coupler housings 630.

To further facilitate the coupling between the connector assemblies 500, 600, the socket connector assembly 500 comprises an assembly wall 550 and an assembly guide 560, and the plug connector assembly 600 comprises an assembly body 650 and a guide receiving space 660 that is defined by the assembly body 650. The assembly wall 550 and the assembly body 650 each have a size and a shape such that an inner side 555 of the assembly wall 550 is configured to receive and, when the connector assemblies 500, 600 are coupled, surround an outer side 655 of the assembly body 650. Further, the assembly guide 560 and the guide receiving space 660 each have a size and a shape such that the guide receiving space 660 is configured to receive and, when the connector assemblies 500, 600 are coupled, surround the assembly guide 560. These configurations of the assembly wall 550, the assembly guide 560, the assembly body 650, and the guide receiving space 660 can increase the stability of a coupling between the connector assemblies 500, 600 and can facilitate alignment of the connector assemblies 500, 600 relative both to each other and to a coupling axis parallel to an axis such as the battery insertion and removal axis 135 of FIGS. 1 and 3.

Returning now to FIGS. 3-4B, since the electrical coupling between the connector assemblies 140, 240 is necessary to deliver power from the removable battery assembly 200 to the materials handling vehicle 100, the coupling between the connector assemblies 140, 240 must necessarily also be properly coupled to ensure sufficient delivery of power to the materials handling vehicle 100 for the materials handling vehicle 100 to operate. Such proper coupling can comprise both the battery body 210 being aligned at least substantially parallel to the battery insertion and removal axis 135 within the battery receiving space 130 and the bottom side 230 of the removable battery assembly 200 being positioned relative to the upward-facing side 132 of the battery receiving space 130 such that the housings of the battery-side electrical couplers 242, 244 are substantially or completely aligned with the housings of the vehicle-side electrical couplers 142, 144.

However, in some embodiments, the removable battery assembly 200 may be heavy such that users may, as a result, experience difficulty placing or removing the battery assembly 200 into or out of the battery receiving space 130 directly along the battery insertion and removal axis 135. As a result, in those embodiments, a user may inadvertently insert or remove the removable battery assembly 200 into or from the battery receiving space 130 at a non-zero angle relative to the battery insertion and removal axis 135, instead of along the battery insertion and removal axis 135. Further, in embodiments where the battery assembly 200 is heavy, the battery assembly 200, during operation of the materials handling vehicle 100, may move within the battery receiving space 130 and relative to the battery insertion and removal axis 135. Such events may result in improper electrical coupling of the connector assemblies 140, 240, posing a risk of damage to the connector assemblies 140, 240 and, similarly, individual couplers of the electrical couplers 142, 144, 242, 244 may face a risk of damage by improper couplings of the vehicle-side electrical couplers 142, 144 and the battery-side electrical couplers 242, 244. These factors pose a risk of, over time, worsening the quality of the electrical coupling between the connector assemblies 140, 240 and thereby worsening the performance of the materials handling vehicle 100, potentially to a degree where the materials handling vehicle 100 can no longer operate.

Returning now to FIGS. 5-6, risks of damage to any of the couplers 520, 540, 620, 640, such as the risks of damage described above, can result from circumstances such as the socket coupler axis 525, before or during coupling, becoming misaligned from the plug coupler axis 625. If such an event occurs prior or during the process of coupling, then one or all of the power socket coupler housing 510, the power socket coupler 520, the power plug coupler housing 610, and/or the power plug coupler 620 can face a risk of damage as a result, as the misalignment of the coupler axes 525, 625 may cause an undesirable impact between some or all of said components. If such an event occurs while the power couplers 520, 620 are coupled, then one or all of the power socket coupler housing 510, the power socket coupler 520, the power plug coupler housing 610, and/or the power plug coupler 620 can face a risk of damage as a result, as the misalignment of the coupler axes 525, 625 may cause an undesirable tension or torque to be applied to parts or the whole of some or all of said components.

Figures 7, 8:
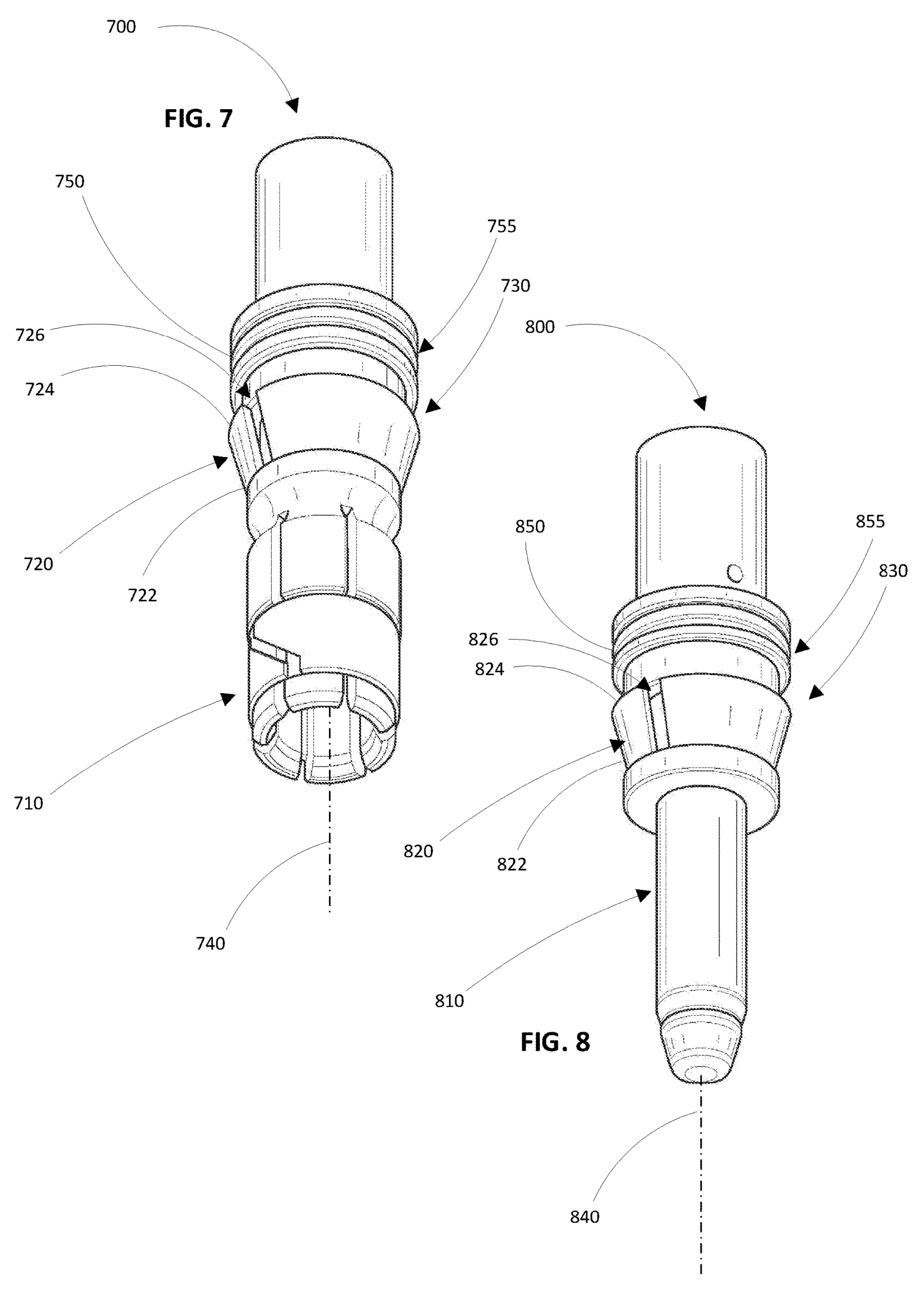
FIG. 7 schematically depicts a socket coupler having an O-ring and an omnidirectional biasing element, according to one or more embodiments described herein.
FIG. 8 schematically depicts a plug coupler having an O-ring and an omnidirectional biasing element, according to one or more embodiments described herein.

Referring now to FIGS. 7-8 a socket coupler 700 and a plug coupler 800 are shown. The socket coupler 700 corresponds to the plug coupler 800 such that a socket 710 of the socket coupler 700 is configured to receive a plug 810 of the plug coupler 800. The couplers 700, 800 are configured for use in connector assemblies such as, e.g., the connector assemblies 500, 600 of FIGS. 5-6, to function as, e.g., power couplers 520, 620 or control couplers 540, 640.

The socket coupler 700 comprises an omnidirectional biasing element 720. In this embodiment, the omnidirectional biasing element 720 is affixed about an elongate body 730 of the socket coupler 700. However, in other embodiments, the omnidirectional biasing element 720 may be affixed around a different part of the socket coupler 700, the omnidirectional biasing element 720 may be affixed to the socket coupler 700 in a different manner, and/or the socket coupler 700 may not comprise the elongate body 730. In this embodiment, the omnidirectional biasing element 720 is disposed around a circumference of the elongate body 730 of the plug coupler 700.

The omnidirectional biasing element 720 is, in this embodiment, a flexible skirt comprising an inner end 722, which is in contact with the elongate body 730, and an outer end 724, where the flexible skirt extends outwardly from the inner end 722 to the outer end 724 and the outer end 724, in this embodiment, extends discontinuously about the circumference of the elongate body 730, as will be described in further detail below. In this embodiment, the outer end 724 defines a greater diameter than the inner end 722. As will be described in further detail below, this configuration enables the omnidirectional biasing element 720 to limit axial movement of the socket coupler 700 relative to a housing (not pictured) of the socket coupler 700 in a decoupling direction along a coupler axis 740. As will also be described in further detail below, this configuration of the ends 722, 724 further enables the omnidirectional biasing element 720 to permit spring-loaded deflection of the socket coupler 700 between a resting position and a deflected position.

The plug coupler 800 comprises an omnidirectional biasing element 820. In this embodiment, the omnidirectional biasing element 820 is affixed about an elongate body 830 of the plug coupler 800. However, in other embodiments, the omnidirectional biasing element 820 may be affixed around a different part of the plug coupler 800, the omnidirectional biasing element 820 may be affixed to the plug coupler 800 in a different manner, and/or the plug coupler 800 may not comprise the elongate body 830. In this embodiment, the omnidirectional biasing element 820 is disposed around a circumference of the elongate body 830 of the plug coupler 800.

The omnidirectional biasing element 820 is, in this embodiment, a flexible skirt comprising an inner end 822, which is in contact with the elongate body 830, and an outer end 824, where the flexible skirt extends outwardly from the inner end 822 to the outer end 824 and the outer end 824, in this embodiment, extends discontinuously about the circumference of the elongate body 830, as will be described in further detail below. In this embodiment, the outer end 824 defines a greater diameter than the inner end 822. As will be described in further detail below, this configuration enables the omnidirectional biasing element 820 to limit axial movement of the plug coupler 800 relative to a housing (not pictured) of the plug coupler 800 in a decoupling direction along a coupler axis 840. As will also be described in further detail below, this configuration of the ends 822, 824 further enables the omnidirectional biasing element 820 to permit spring-loaded deflection of the plug coupler 800 between a resting position and a deflected position.

It is noted that the present description and claims refer to various components as "omnidirectional biasing elements." Such an "omnidirectional biasing element" is an element which may permit "omnidirectional spring-loaded deflection" of, e.g., the omnidirectional biasing element itself or an article (i.e., a "biased element") to which the omnidirectional biasing element is attached, coupled, or otherwise associated with or a component of. Permitting such "omnidirectional spring-loaded deflection" encompasses permitting deflection such that a biased element, when angularly displaced relative to a pairing axis of the biased element and from a resting position in any direction not parallel to the pairing axis of the biased element such that the omnidirectional biasing element is engaged (e.g., by making contact with an external surface), is biased toward the resting position. Such biasing, in some embodiments, includes imparting upon the biased element a restorative force, wherein the restorative force biases the biased element toward a resting position of the biased element.

While the omnidirectional biasing elements 720, 820 permit omnidirectional spring-loaded deflection and are, in this embodiment, flexible skirts, it is noted that permitting omnidirectional spring-loaded deflection does not require an outer end (or any similar or analogous component) of an omnidirectional biasing element to extend continuously about an entirety of a circumference of a coupler or about an entirety of a circumference of an elongate body of a coupler. Rather, in some embodiments, an outer end of an omnidirectional biasing element may extend discontinuously about the circumference of the elongate body. For example, the omnidirectional biasing elements 720, 820 each have a gap 726, 826, respectively, and, therefore, the outer ends 724, 824 each extend discontinuously about the circumference of a respective one of the elongate bodies 730, 830. Despite the presence of the gaps 726, 826, the omnidirectional biasing elements 720, 820 nonetheless permit deflection such that, when angularly displaced from a resting position in any direction not parallel to the pairing axis of the biased element such that the omnidirectional biasing element is engaged, a respective one of the couplers 700, 800 is biased toward a resting position. Other embodiments may have more gaps similar to the gaps 726, 826, and some embodiments may have no gaps or have one or more discontinuities dissimilar to the gaps 726, 826.

Further, the outer ends 724, 824 are, in the embodiments of FIGS. 7-8, of uniform distance from a respective one of the inner ends 722, 822 (i.e., all points along the outer ends 724, 824 are equidistant to a respective point of a respective one of the inner ends 722, 822 at a same radial degree relative to the respective one of the pairing axes 740, 840). However, in other embodiments, an outer end of an omnidirectional biasing element may not be similarly uniform, and may instead be non-uniform, including being, e.g., slotted, corrugated, or wavy. As such, a biasing element having the capacity to permit "omnidirectional spring-loaded deflection" does not necessitate the biasing element having the exact structure depicted in the embodiments of FIGS. 7-8 (or those embodiments depicted in or described subsequently below in reference to FIGS. 9-11).

Rather, having the capacity to permit "omnidirectional spring-loaded deflection" is determined by the functionality of an element, and is not determined by an element having the exact structure depicted in the embodiments of FIGS. 7-8 (or those embodiments depicted in or described subsequently below in reference to FIGS. 9-11). Permitting "omnidirectional spring-loaded deflection" is instead defined by the capacity of an element to permit a spring-loaded deflective force imparted upon a deflected element and directed from a deflected element toward a pairing axis of the deflected element at an angle substantially aligned with a radial vector extending from the axis to the deflected element, wherein the radial angle may be any angle relative to the pairing axis. Further description of such angles and vectors, and further description of what may constitute "substantially aligned," may be found below with reference to FIG. 17. In this embodiment, and as will be described in further detail below, each of the couplers 700, 800 may be configured to be able to move relative to a respective connector assembly (not pictured), such as, e.g., the connector assemblies 500, 600 of FIGS. 5-6. Due to this capacity to move relative to their respective connector assemblies, the couplers 700, 800 may be capable of occupying one of several possible positions relative to their respective axes 740, 840, such as a resting position and deflected position described above.

A resting position of the couplers 700, 800 occurs when the couplers 700, 800 are at rest, where each resting position forms a resting angle between the couplers 700, 800 and the respective axis of the axes 740, 840. The resting angle may be 0 (i.e., a resting position of the couplers 700, 800 where the respective one of the couplers 700, 800 is completely aligned with their respective axes 740, 840), but the resting angle may also be greater than zero such that the couplers 700, 800 are nonetheless substantially aligned with their respective axes 740, 840. Conversely, the deflected positions of the couplers 700, 800 may be one of multiple possible angled deflected positions, where each angled deflected position corresponds to either of the couplers 700, 800 forming a different deflected angle relative to the respective axes 740, 840. Each of the deflected angles of the couplers 700, 800 is greater than the resting angle. As will be described in further detail below, the omnidirectional biasing elements 720, 820 are configured to provide a spring-loaded deflection of the couplers 700, 800, respectively, from one of the deflected positions toward a resting position. Such spring-loaded deflection may occur as a result of a restorative force imparted by each of the omnidirectional biasing elements 720, 820 upon the elongate bodies 710, 810, respectively, where the restorative force biases the elongate bodies 710, 810 toward a respective resting position of the couplers 700, 800. As will be described in further detail below, such biasing of the elongate bodies 710, 810 can decrease the risk of damage to the couplers 700, 800 through ordinary course of use, e.g., due to the causes and circumstances described above, as, when the couplers 700, 800 are coupled, the omnidirectional biasing elements 720, 820 can permit spring-loaded deflection of the couplers 700, 800 and can further limit axial movement of the couplers 700, 800 along the axes 740, 840 in a decoupling direction.

In this embodiment, the socket coupler 700 further comprises an O-ring 750 and a groove 755, where the groove 755 houses the O-ring 750, and, in this embodiment, the O-ring 750 and the groove 755 are positioned on the elongate body 730. However, in other embodiments, the socket coupler 700 may not comprise the O-ring 750 and/or the groove 755, and the O-ring 750 and/or the groove 755 may be positioned elsewhere on the socket coupler 700.

In this embodiment, the plug coupler 800 also further comprises an O-ring 850 and a groove 855, where the groove 855 houses the O-ring 850, and, in this embodiment, the O-ring 850 and the groove 855 are positioned on the elongate body 830. However, in other embodiments, the plug coupler 800 may not comprise the O-ring 850 and/or the groove 855, and the O-ring 850 and/or the groove 855 may be positioned elsewhere on the plug coupler 800.

Each or either of the O-rings 750, 850 may comprise a flexible material, such that the O-rings 750, 850 increase the elasticity of collisions of the couplers 700, 800, respectively with other objects when such collisions impact the O-rings 750, 850. Further, each or either of the O-rings 750, 850 may additionally or alternatively comprise a high-friction material, such that contact between the O-rings 750, 850 and an external surface, e.g., limits the ability of the couplers 700, 800, respectively, to move relative to the external surface or creates a seal between a respective one of the elongate bodies 730, 830 and an external surface.

Figure 9:
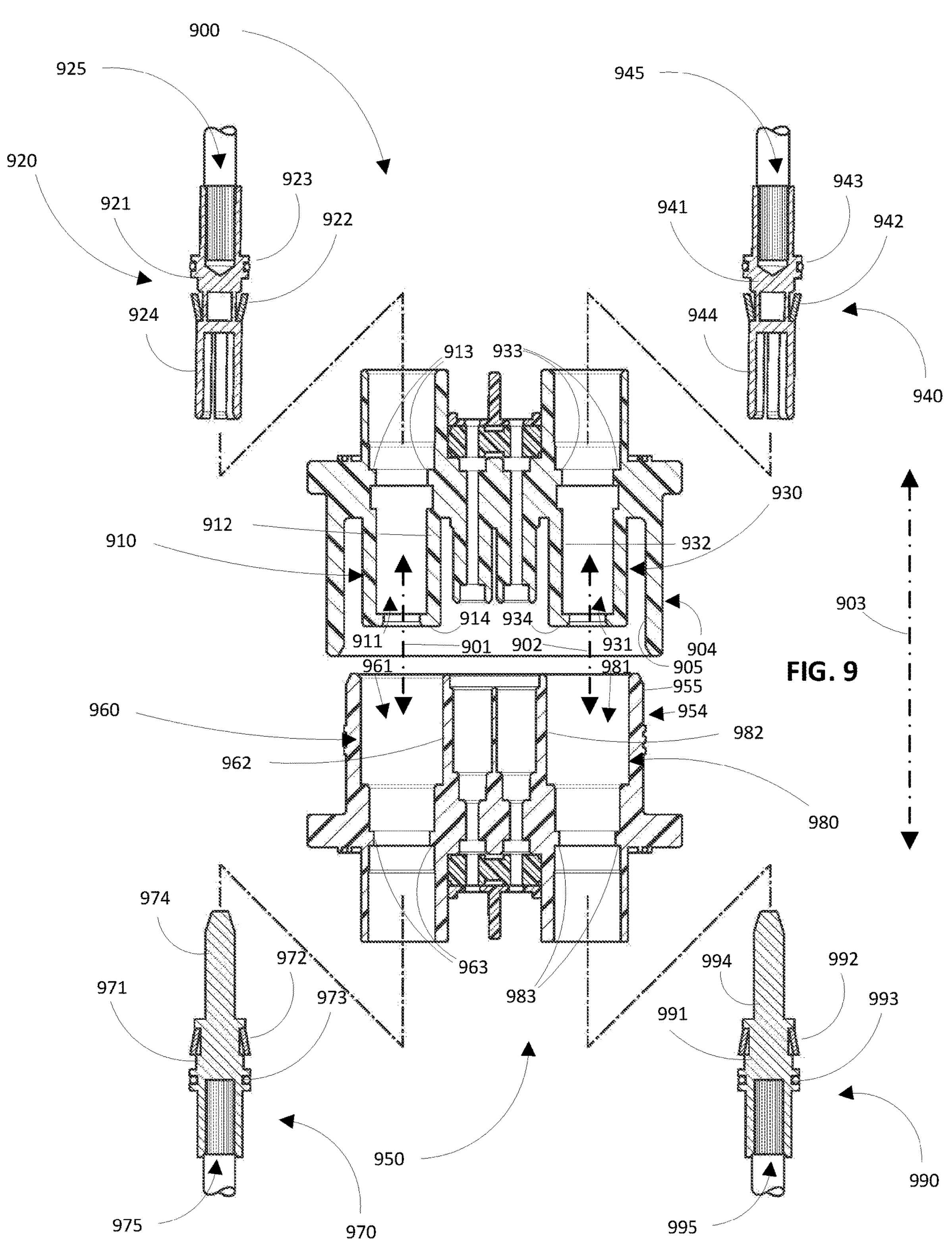
FIG. 9 schematically depicts a socket connector assembly and a plug connector assembly in an exploded view, according to one or more embodiments described herein.

Referring now to FIG. 9, a socket connector assembly 900 and a plug connector assembly 950 are depicted, and the connector assemblies 900, 950 are configured to correspond to each other to enable electrical communication between the two connector assemblies 900, 950 and, further, to any electrical devices to which each connector assembly is attached, such as, e.g., the removable battery assembly 200 or the materials handling vehicle 100. The socket connector assembly 900 comprises a first socket housing 910, a first socket coupler 920, a second socket housing 930, and a second socket coupler 940. The plug connector assembly 950 comprises a first plug housing 960, a first plug coupler 970, a second plug housing 980, and a second plug coupler 990.

Each of the couplers 920, 940, 970, 990 is secured within a respective one of the housings 910, 930, 960, 980. The couplers 920, 940, 970, 990 each comprise a respective elongate body 921, 941, 971, 991, each of the elongate bodies 921, 941, 971, 991 comprising a respective omnidirectional biasing element 922, 942, 972, 992 and a respective O-ring 923, 943, 973, 993. The socket couplers 920, 940 each have a respective socket 924, 944, and the plug couplers 970, 990 each have a respective plug 974, 994. Each of the couplers 920, 940, 970, 990 further comprise a respective inner end 925, 945, 975, 995, and each of the inner ends 925, 945, 975, 995 may comprise a respective conductor. The respective conductors may be configured to couple, directly or indirectly, the respective coupler 920, 940, 970, 990 to an electrical interface, and each of the inner ends 925, 945, 975, 995 may be configured to house the respective conductor of each of the inner ends 925, 945, 975, 995.

Each of the housings 910, 930, 960, 980, have a respective first housing space 911, 931, 961, 981, each of the first housing spaces 911, 931, 961, 981 having a respective first housing wall 912, 932, 962, 982, where each first housing wall 912, 932, 962, 982 extends, in this embodiment, circumferentially about the respective first housing space 911, 931, 961, 981 (similarly to, for example, the circular shape of the housings 510, 610 of FIGS. 5-6). In other embodiments, any of the housings 910, 930, 960, 980, the first housing spaces 911, 931, 961, 981, and/or the first housing walls 912, 932, 962, 982 may comprise a different shape. Each of the housings 910, 930, 960, 980 further comprise an inner shoulder 913, 933, 963, 983. In this embodiment, inner shoulders 913, 933, 963, 983 define an inner bound of the respective first housing spaces 911, 931, 961, 981. In this embodiment, a distal end of the plug housings 960, 980 defines an outer bound of the first housing spaces 961, 981, while a measure of an outer bound, in this embodiment, of the first housing spaces 911, 931 is described in further detail below. The inner shoulders 913, 933, 963, 983 each further define a respective inner shoulder diameter, and a respective outer end of each of the omnidirectional biasing elements 922, 942, 972, 992 each define a respective outer end diameter. In this embodiment, the outer end diameter of each of the omnidirectional biasing elements 922, 942, 972, 992 is greater than the inner shoulder diameter of each of the corresponding inner shoulders of the inner shoulders 913, 933, 963, 983. However, in other embodiments, the inner shoulder diameter may be smaller than or equal to the outer end diameter.

The housings 910, 960 collectively comprise a first pairing axis 901, and the housings 930, 980 collectively comprise a second pairing axis 902. The socket connector assembly 900 and the plug connector assembly 950 collectively comprise an insertion and removal axis 903, and the pairing axes 901, 902 are parallel to the insertion and removal axis 903. The socket coupler 920 and the plug coupler 970 are configured to couple together electrically as a result of relative movement along the first pairing axis 901, and the socket coupler 940 and the plug coupler 990 are configured to couple together electrically as a result of relative movement along the second pairing axis 902.

It is noted that the present description and claims refer to movement of various components "in a coupling direction" or "in a decoupling direction" along respective pairing axes. This movement "in a coupling direction" along an axis encompasses movement along the respective axis that will bring a respective component or components closer to each other or otherwise result in the components coupling together. For example, if the socket coupler 920 moved toward the plug coupler 970 along the first pairing axis 901, the socket coupler 920 would be moving in a coupling direction. Conversely, movement "in a decoupling direction" encompasses movement along the respective axis that will bring a respective component or components further from coupling together or result in a decoupling of respective components. For example, if the socket coupler 920 moved away from the plug coupler 970 along the first pairing axis 901, the socket coupler 920 would be moving in a decoupling direction.

The couplers 920, 940, 970, 990 each have a size and shape configured to correspond to a size and shape of the respective housings 910, 930, 960, 980. However, and as will be described in further detail below, the sizes and shapes of the couplers 920, 940, 970, 990 do not completely occupy the space within the respective housings 910, 930, 960, 980. The socket housings 910, 930 and the plug housings 960, 980 comprise, in the embodiment of these figures, certain differences relating to the function of each of the housings

910, 930, 960, 980. The socket housings 910, 930 each comprise an outer lip 914, 934, each outer lip 914, 934 extending around a distal end of a respective one of the sockets 924, 944 and enclosing a respective one of the first housing spaces 911, 931. Each of the outer lips 914, 934 may be configured to guide a corresponding one of the plug couplers 970, 990 into a respective one of the sockets 924, 944 by, e.g., deflecting a distal end of each of the plugs 974, 994 in a coupling direction or toward a respective one of the pairing axes 901, 902. Further, the outer lips 914, 934 define, in this embodiment, an outer bound of the housing spaces 911, 931. Additionally, the first housing spaces 911, 931 of the socket housings 910, 930 comprise, in this embodiment, a smaller volume of space than the first housing spaces 961, 981 of the plug housings 960, 980. The greater volume of the first housing spaces 961, 981 may enable the plug couplers 970, 990 to occupy a wider array of spring-loaded deflected positions when compared to the socket couplers 920, 940 due to, e.g., a lesser need for a broader array of spring-loaded deflected positions for the socket couplers 920, 940 on account of, in this embodiment, the guiding capabilities of the outer lips 914, 934. However, in other embodiments, the first housing spaces 911, 931, 961, 981 may all have the same volume of space, or, in other embodiments, the first housing spaces 911, 931 may occupy a greater volume of space than the first housing spaces 961, 981.

The connector assemblies 900, 950 further exhibit more general differences, including differences enabling each of the connector assemblies 900, 950 to more readily correspond to one another. The socket connector assembly 900 comprises an assembly wall 904 comprising an inner side 905, and the plug assembly 950 comprises an assembly body 954 comprising an outer side 955. The assembly wall 904 and the assembly body 954 each have a size and a shape such that an inner side 905 of the assembly wall 904 is configured to receive and, when the connector assemblies 900, 950 are coupled, surround an outer side 955 of the assembly body 954.

Figures 10A, 10B:
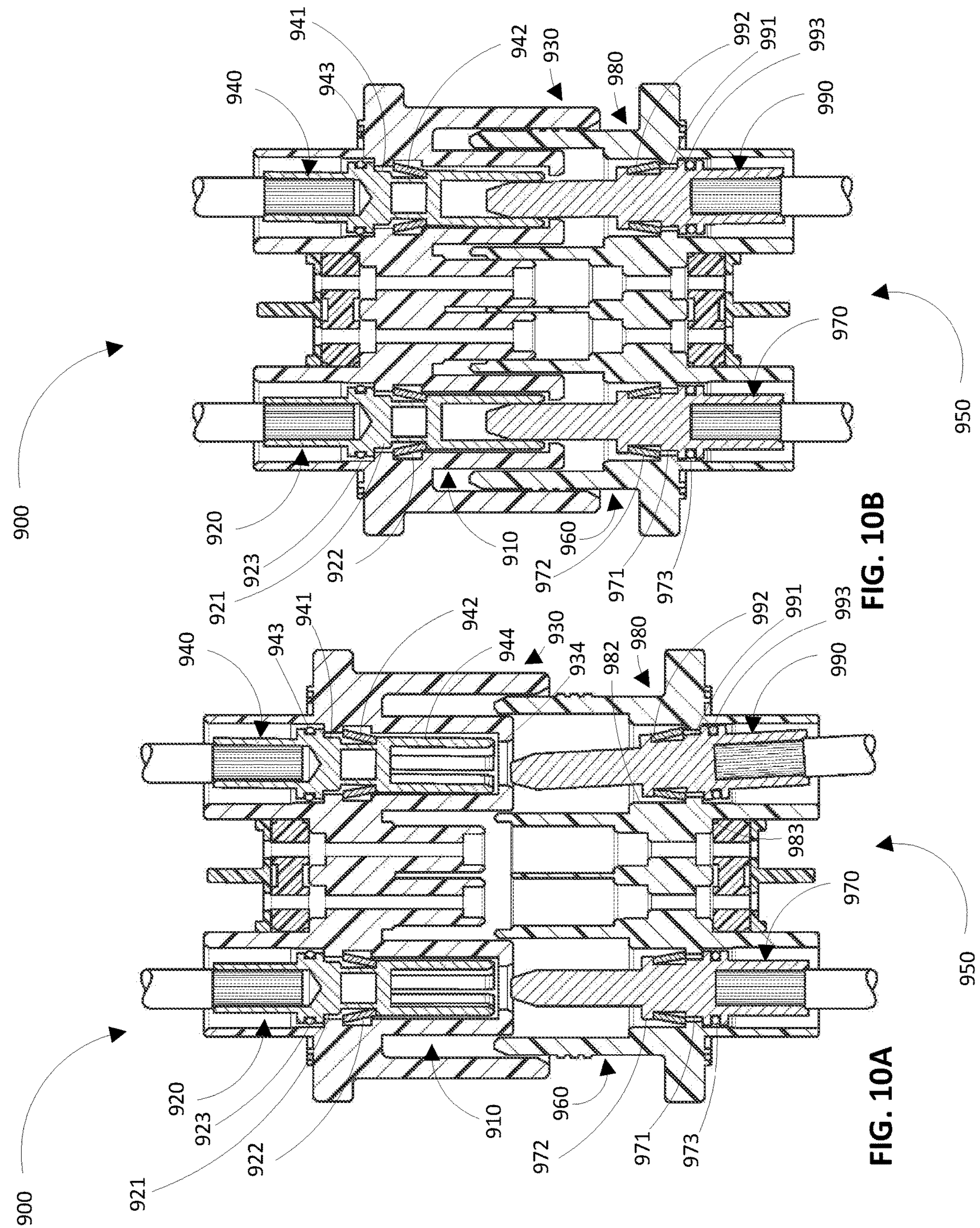
FIGS. 10A-B schematically depict the connector assemblies of FIG. 9 in a first exemplary context while coupling, where a plug coupler and a socket coupler are each in a spring-loaded deflected position, according to one or more embodiments described herein.

Referring now to FIGS. 10A-B, a coupling of the connector assemblies 900, 950 is depicted in a first exemplary context. The couplers 920, 940, 970, 990 are now depicted within their respective connector assemblies of the connector assemblies 900, 950. In the depiction of these figures, the omnidirectional biasing elements 922, 942, 972, 992 are depicted limiting axial movement of the respective couplers 920, 940, 970, 990 relative to the respective housings 910, 930, 960, 980 in a decoupling direction along the respective pairing axes 901, 902 by, e.g., an outer end of each of the omnidirectional biasing elements 922, 942, 972, 992 contacting the respective inner shoulders 913, 933, 963, 983 and thereby prohibiting movement beyond the outer ends of the respective omnidirectional biasing elements 922, 942, 972, 992. Further, the o-rings 923, 943, 973 are depicted creating a seal between the respective elongate bodies 921, 941, 971 and the respective first housing walls 912, 932, 962. Further, the o-rings 923, 943, 973, 993 are positioned and configured such that the o-rings 923, 943, 973, 993 limit axial movement of the respective couplers 920, 940, 970, 990 relative to the respective housings 910, 930, 960, 980 in a decoupling direction along the respective pairing axes 901, 902 by, e.g., providing a frictional force due to contact with a respective one of the housings 910, 930, 960, 980.

FIG. 10A depicts the connector assemblies 900, 950 having moved in a coupling direction relative to the positions of the connector assemblies 900, 950 in FIG. 9. FIG. 10A depicts the omnidirectional biasing element 992 making contact with the inner shoulder 983 and the first housing wall 992, as the second plug coupler 990 is, in FIG. 10A, in a spring-loaded deflected position. In this spring-loaded deflected position, and due to either or both of the contact of the omnidirectional biasing element 992 with the inner shoulder 983 or the first housing wall 982, the omnidirectional biasing element 992 permits omnidirectional spring-loaded deflection of the second plug coupler 990 because, e.g., the omnidirectional biasing element 992 is configured to function as a spring when pressed against external surfaces (e.g., components of the connector assemblies 900, 950) and thereby deflect the elongate body 991 from the external surface. In the example of FIG. 10A, the omnidirectional biasing element 992 imparts upon the elongate body 991 a restorative force, wherein the restorative force biases the second plug coupler 990 toward a resting position of the second plug coupler 990. Further, the outer lip 934 is depicted guiding the second plug coupler 990 into the socket 944 by, e.g., deflecting a distal end of the plug 994 and thereby biasing the second plug coupler 990 toward a resting position of the second plug coupler 990. Finally, the o-ring 993 can be seen to be pressing against the second plug housing 980. Since, in this embodiment, the o-ring 993 comprises a flexible material, the o-ring 993 also biases the second plug coupler 990 toward a resting position of the second plug coupler 990 by, e.g., imparting upon the elongate body 991 a restorative force due to, e.g., an elastic quality of the o-ring 993. As depicted in FIG. 10B, each of these described effects either separately or collectively result in the proper coupling of the second plug coupler 990 and the second socket coupler 940. However, it should be appreciated that, while such biasing of a coupler may be necessary in certain circumstances to properly couple two couplers, such as the couplers 930, 990 in FIGS. 10A-B, in other circumstances such biasing of a coupler may not be necessary to properly couple two couplers, such as the couplers 920, 970 in FIGS. 10A-B.

FIG. 10A further depicts the second socket coupler 940 in a spring-loaded deflected position. Similarly to the configuration and placement of the plug coupler 990 in the same figure, the omnidirectional biasing element 942 and the o-ring 943, both separately and collectively, bias the socket coupler 940 toward a resting position of the second socket coupler 940. However, the spring-loaded deflected position of the second socket coupler 940 has a lesser angle relative to the second pairing axis 902 than the spring-loaded deflected position of the second plug coupler 990. Differences between angles of spring-loaded deflected positions can result from, e.g., the circumstances and/or forces causing either or both of the couplers 940, 990 to occupy spring-loaded deflected positions or, as described above, the lesser amount of space in the second socket housing 930 in which the second socket coupler 940 may occupy spring-loaded deflected positions.

Even when coupled, couplers described herein may nonetheless occupy spring-loaded deflected positions. For example, the couplers 940, 990, as depicted in FIG. 10B, are beginning to couple despite each of the couplers 940, 990 being in a spring-loaded deflected position. This capacity to occupy spring-loaded deflected positions prior to, during, and after coupling can enable the couplers 920, 940, 970, 990 to have an improved capacity to both properly couple and remain properly coupled in comparison to similar couplers without such capacity. As a result of this capacity, the couplers 920, 940, 970, 990 can be provided with a decreased risk of damage, e.g., due to the causes and circumstances described above, as the couplers 920, 940, 970, 990 can occupy spring-loaded deflected positions to, e.g., flex, pivot, or otherwise react to shocks, improper alignment between couplers of a coupler pair, or other circumstances such as those described above.

Figure 11:
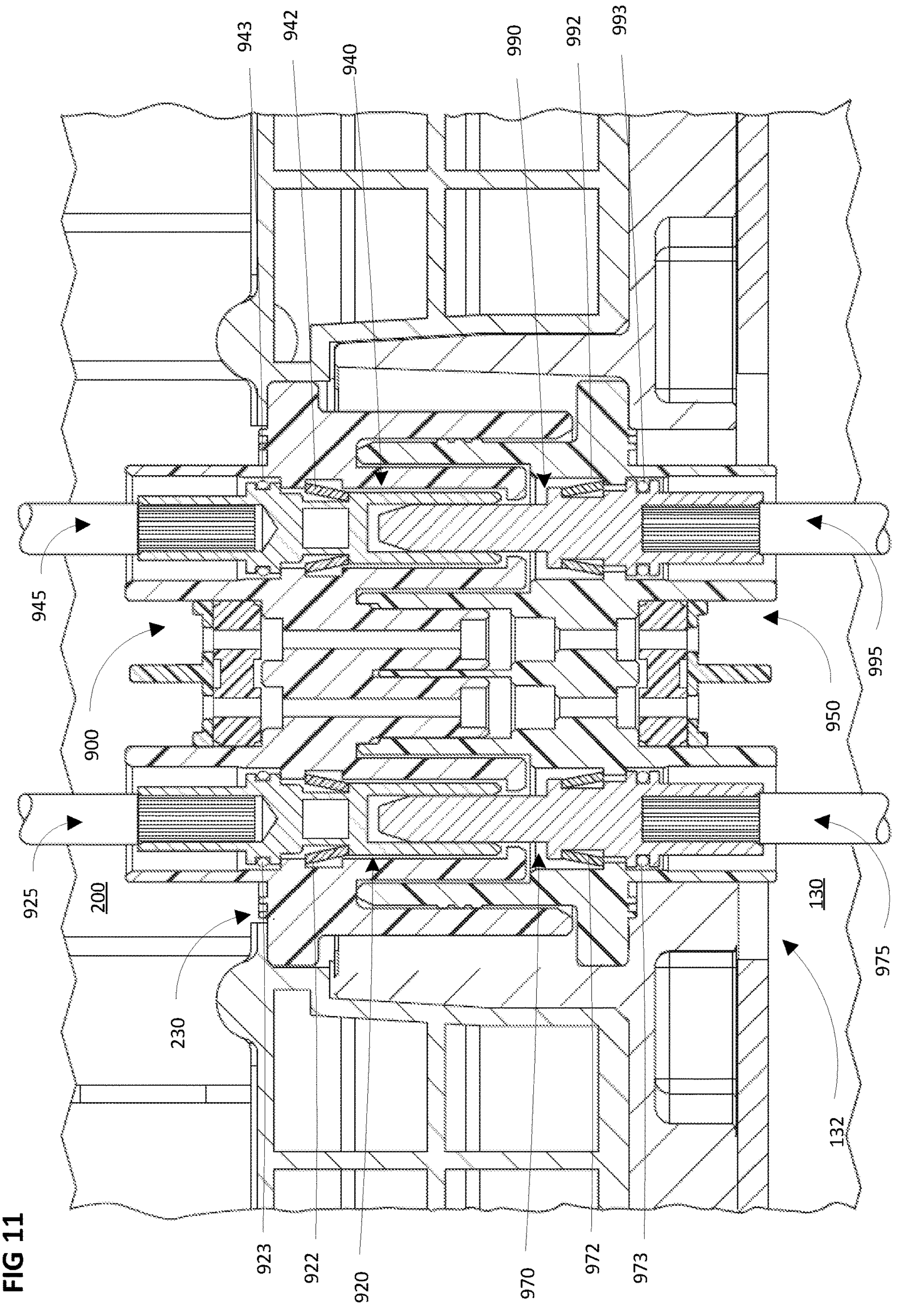
FIG. 11 schematically depicts the connector assemblies of FIG. 9 coupled together in a second exemplary context, according to one or more embodiments described herein.

Referring now to FIG. 11, a coupling of the connector assemblies 900, 950 is depicted in a second exemplary context. In the embodiment of FIG. 11, the socket connector assembly 900 is electrically coupled to and physically affixed to the bottom side 230 of the removable battery assembly 200 of FIG. 4A, while the plug connector assembly 950 is electrically coupled to and physically affixed to the upward-facing side 132 of the receiving space 130 of the materials handling vehicle 100. In this embodiment, the connector assemblies 900, 950 are coupled together, and conductors, housed in the inner ends 925, 945, 975, 995, are electrically coupled to respective ones of the couplers 920, 940, 970, 990 and, either directly or by proxy, electrically coupled to a respective one of the materials handling vehicle 100 and/or the removable battery assembly 200.

In this exemplary context, due to, e.g., the presence of the omnidirectional biasing elements 922, 942, 972, 992, the presence of the o-rings 923, 943, 973, 993, and/or the capacity of the couplers 920, 940, 970, 990 to occupy deflected positions, the couplers 920, 940, 970, 990 may have a decreased risk of improper coupling, damage to the couplers, or other harmful effects, and, similarly, the connector assemblies 900, 950 and, as a result, the materials handling vehicle 100 and the removable battery assembly 200 may have an improved electrical coupling than if, e.g., the above-listed components and capacities or other components or capacities described herein were omitted from the connector assemblies 900, 950.

Figures 12, 13:
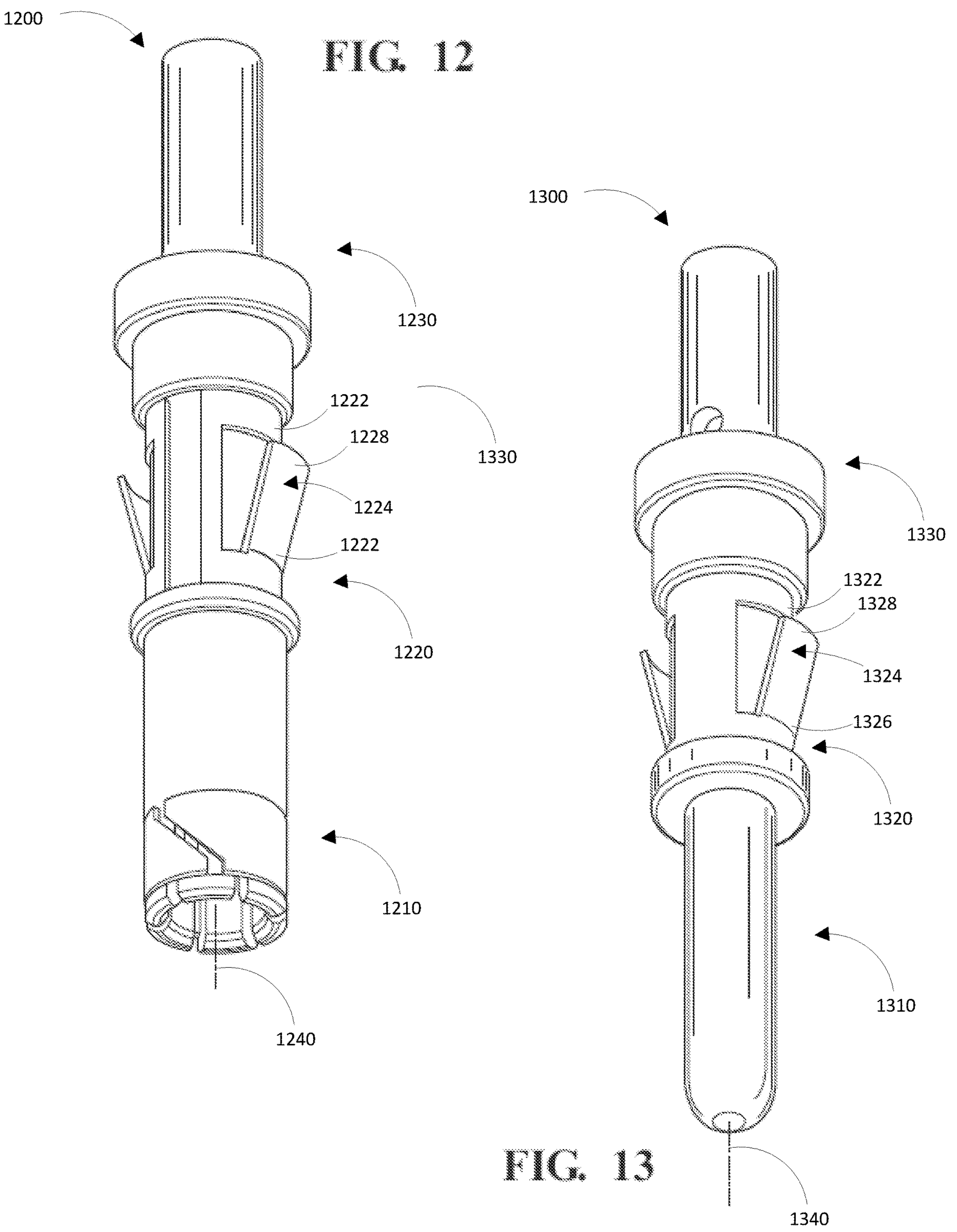
FIG. 12 schematically depicts a socket coupler having a bidirectional biasing element, according to one or more embodiments described herein.
FIG. 13 schematically depicts a plug coupler having a bidirectional biasing element, according to one or more embodiments described herein.

Referring now to FIGS. 12-13, a socket coupler 1200 and a plug coupler 1300 are shown. The socket coupler 1200 corresponds to the plug coupler 1300 such that a socket 1210 of the socket coupler 1200 is configured to receive a plug 1310 of the plug coupler 1300. The couplers 1200, 1300 are configured for use in connector assemblies such as, e.g., the connector assemblies 500, 600 of FIGS. 5-6, to function as, e.g., power couplers 520, 620 or control couplers 540, 640.

The socket coupler 1200 comprises a bidirectional biasing element 1220. In this embodiment, the bidirectional biasing element 1220 is affixed about an elongate body 1230 of the socket coupler 1200. However, in other embodiments, the bidirectional biasing element 1220 may be affixed around a different part of the socket coupler 700, the bidirectional biasing element 1220 may be affixed to the socket coupler 1200 in a different manner, and/or the socket coupler 1200 may not comprise the elongate body 1230. In this embodiment, the bidirectional biasing element 1220 is disposed around a circumference of the elongate body 1230 of the plug coupler 1200.

The bidirectional biasing element 1220, in this embodiment, comprises a base 1222, extending, in this embodiment, partially about the elongate body 1230, and two flanges 1224. In other embodiments, the bidirectional biasing element 1220 may not comprise the base 1222 or the base 1222 may instead extend entirely about the elongate body 1230 or extend about the elongate body 1230 to a differing degree than depicted in FIG. 12. Each of the two flanges 1224 comprise an inner end 1226 and an outer end 1228, where each flange 1224 extends outwardly from the respective inner end 1226 to the respective outer end 1228 and the outer ends 1228, in this embodiment, each extend continuously about a portion of the circumference of the elongate body 1230, as will be described in further detail below. In this embodiment, the outer end 1228 defines a greater diameter than the inner end 1226. As will be described in further detail below, this configuration enables the bidirectional biasing element 1220 to limit axial movement of the socket coupler 1200 relative to a housing (not pictured) of the socket coupler 1200 in a decoupling direction along a coupler axis 1240. As will also be described in further detail below, this configuration of the ends 1226, 1228 further enables the bidirectional biasing element 1220 to permit bidirectional spring-loaded deflection of the socket coupler 1200 between a resting position and a deflected position.

The plug coupler 1300 comprises a bidirectional biasing element 1320. In this embodiment, the bidirectional biasing element 1320 is affixed about an elongate body 1330 of the plug coupler 1300. However, in other embodiments, the bidirectional biasing element 1320 may be affixed around a different part of the plug coupler 1300, the bidirectional biasing element 1320 may be affixed to the plug coupler 1300 in a different manner, and/or the plug coupler 1300 may not comprise the elongate body 1330. In this embodiment, the bidirectional biasing element 1320 is disposed around a circumference of the elongate body 1330 of the plug coupler 1300.

The bidirectional biasing element 1320, in this embodiment, comprises a base 1322, extending, in this embodiment, partially about the elongate body 1330, and two flanges 1324. In other embodiments, the bidirectional biasing element 1320 may not comprise the base 1322 or the base 1322 may instead extend entirely about the elongate body 1330 or extend about the elongate body 1330 to a differing degree than depicted in FIG. 13. Each of the two flanges 1324 comprise an inner end 1326 and an outer end 1328, where each flange 1324 extends outwardly from the respective inner end 1326 to the respective outer end 1328 and the outer ends 1328, in this embodiment, each extend continuously about a portion of the circumference of the elongate body 1330, as will be described in further detail below. In this embodiment, the outer end 1328 defines a greater diameter than the inner end 1326. As will be described in further detail below, this configuration enables the bidirectional biasing element 1320 to limit axial movement of the socket coupler 1300 relative to a housing (not pictured) of the socket coupler 1300 in a decoupling direction along a coupler axis 1340. As will also be described in further detail below, this configuration of the ends 1326, 1328 further enables the bidirectional biasing element 1320 to permit spring-loaded deflection of the socket coupler 1300 between a resting position and a deflected position.

It is noted that the present description and claims refer to various components as “bidirectional biasing elements.” Such a “bidirectional biasing element” is an element which may permit “bidirectional spring-loaded deflection” of, e.g., the bidirectional biasing element itself or an article (i.e., a “biased element”) to which the bidirectional biasing element is attached, coupled, or otherwise associated with or a component of. Permitting such “bidirectional spring-loaded deflection” encompasses permitting deflection such that a biased element, when angularly displaced relative to a pairing axis of the biased element and from a resting position in one of two directions (e.g., in one of two opposing directions) not parallel to the pairing axis of the biased element to a degree such that the bidirectional biasing element is engaged (e.g., by making contact with an external surface), is biased toward a resting position.

“Bidirectional biasing elements” and “bidirectional spring-loaded deflection” differ from “omnidirectional biasing elements” and “omnidirectional spring-loaded deflection” by, in the case of “bidirectional biasing elements” and "bidirectional spring-loaded deflection," providing and including, respectively, a more limited range of spring-loaded deflection than "omnidirectional biasing elements" and "omnidirectional spring-loaded deflection." Particularly, permitting "omnidirectional spring-loaded deflection" encompasses permitting spring-loaded deflection such that a biased element, when angularly displaced relative to a pairing axis of the biased element and from a resting position in any direction not parallel to the pairing axis of the biased element such that the omnidirectional biasing element is engaged, is biased toward the resting position, while permitting "bidirectional spring-loaded deflection" encompasses permitting a more limited range of spring-loaded deflection such that a biased element, when angularly displaced relative to the pairing axis of the biased element and from the resting position in one of two directions (rather than any direction) not parallel to the pairing axis of the biased element such that the bidirectional biasing element is engaged, is biased toward the resting position. However, the two directions in which bidirectional spring-loaded deflection is permitted need not be limited to two distinct angles relative to the pairing axis of the biased element (although, in some embodiments, bidirectional spring-loaded deflection is limited as such). Rather, the two directions in which bidirectional spring-loaded deflection is permitted can, in other embodiments, each include a range of angles relative to the pairing axis from which the bidirectional biasing element can permit bidirectional spring-loaded deflection, wherein the range of angles included in the first direction is entirely distinct from the range of angles included in the second direction (i.e., where no angle in the first range is present in the second direction). Conversely, permitting "omnidirectional spring-loaded deflection" is limited by no such sets of distinct angular ranges of permitted spring-loaded deflection, and, instead, permitting omnidirectional spring-loaded deflection includes permitting spring-loaded deflection from any angle.

Due to the above-described limitations of bidirectional biasing elements in comparison to omnidirectional biasing elements, bidirectional biasing elements may be, in some circumstances, less desirable due to the lesser angular range of spring-loaded deflection permitted by bidirectional biasing elements in comparison with the range of spring-loaded deflection permitted by omnidirectional biasing elements. However, and as will be described in further detail below, certain contexts may nonetheless provide incentives for the use of bidirectional biasing elements rather than omnidirectional biasing elements.

While the bidirectional biasing elements 1220, 1320 permit bidirectional spring-loaded deflection and comprise flanges 1224, 1324 comprising continuous outer ends 1228, 1328, it is noted that permitting bidirectional spring-loaded deflection does not require an outer end of a flange (or any similar or analogous component) of a bidirectional biasing element to extend continuously about a portion of a circumference of a coupler or about a portion of a circumference of an elongate body of a coupler. Rather, in some embodiments, an outer end of a flange of a bidirectional biasing element may extend discontinuously about a portion of the circumference of the elongate body.

Additionally, in some embodiments, the outer ends of a flange (or any similar or analogous component) of a bidirectional biasing element may, in some embodiments, extend about up to 60 degrees of a circumference of an elongate body of a coupler. In other embodiments, the outer ends of a flange (or any similar or analogous component) of a bidirectional biasing element may extend about up to 45 degrees of a circumference of an elongate body of a coupler. In a further embodiment, the outer ends of a flange (or any similar or analogous component) of a bidirectional biasing element may extend about up to 30 degrees of a circumference of an elongate body of a coupler.

Further, the outer ends 1228, 1328 are, in the embodiments of FIGS. 12-13, of uniform distance from a respective one of the inner ends 1226, 1326 (i.e., all points along the outer ends 1228, 1328 are equidistant to a respective point of a respective one of the inner ends 1226, 1326 at a same radial degree relative to the respective one of the pairing axes 1240, 1340). However, in other embodiments, an outer end of a flange of a bidirectional biasing element may not be similarly uniform, and may instead be non-uniform, including being, e.g., slotted, corrugated, or wavy. As such, a biasing element having the capacity to permit "bidirectional spring-loaded deflection" does not necessitate the biasing element having the exact structure depicted in the embodiments of FIGS. 12-13 (or those embodiments depicted in or described subsequently below in reference to FIGS. 14-16).

Rather, having the capacity to permit "bidirectional spring-loaded deflection" is determined by the functionality of an element, and is not determined by an element having the exact structure depicted in the embodiments of FIGS. 12-13 (or those embodiments depicted in or described subsequently below in reference to FIGS. 14-16). Permitting "bidirectional spring-loaded deflection" is instead defined by the capacity of an element to permit a spring-loaded deflective force imparted upon a deflected element and directed from a deflected element toward a pairing axis of the deflected element at an angle substantially aligned with a radial vector extending from the axis to the deflected element, wherein the radial angle may be one of two distinct angles of deflection or any angle within the two entirely distinct angular ranges of deflection. Further description of such angles and vectors, and further description of what may constitute being "substantially aligned," may be found below with reference to FIG. 17. In some embodiments, a force directed at an angle "substantially aligned" with the radial angle of the deflected element relative to a pairing axis may include spring-loaded deflective forces directed within a 30 degree threshold relative to the radial angle of deflection. In other embodiments, a force directed at an angle "substantially aligned" with the radial angle of the deflected element relative to a pairing axis may include spring-loaded deflective forces directed within a 25 degree threshold relative to the radial angle of deflection. In other embodiments, a force directed at an angle "substantially aligned" with the radial angle of the deflected element relative to a pairing axis may include spring-loaded deflective forces directed within a 20 degree threshold relative to the radial angle of deflection. In other embodiments, a force directed at an angle "substantially aligned" with the radial angle of the deflected element relative to a pairing axis may include spring-loaded deflective forces directed within a 15 degree threshold relative to the radial angle of deflection. In other embodiments, a force directed at an angle "substantially aligned" with the radial angle of the deflected element relative to a pairing axis may include spring-loaded deflective forces directed within a 10 degree threshold relative to the radial angle of deflection. In other embodiments, a force directed at an angle "substantially aligned" with the radial angle of the deflected element relative to a pairing axis may include spring-loaded deflective forces directed within a 5 degree threshold relative to the radial angle of deflection.

In alternative embodiments, the bidirectional biasing elements 1220, 1320 may have a differing number of flanges 1224, 1324 than the embodiments depicted in FIGS. 12-13. In such embodiments, the biasing elements may not permit bidirectional spring-loaded deflection but will instead permit, e.g., tridirectional spring-loaded deflection or another number of directions of spring-loaded deflection. For example, an alternative embodiment may have a biasing element with three flanges, and permit tridirectional spring-loaded deflection A resting positions of the couplers 1200, 1300 occur when the couplers 1200, 1300 form a resting angle between the couplers 1200, 1300 and the respective axis of the axes 1240, 1340. The resting angle may be 0 (i.e., a resting position of the couplers 1200, 1300 are completely aligned with their respective axes 1240, 1340), but the resting angle may also be greater than zero such that the couplers 1200, 1300 are nonetheless substantially aligned with their respective axes 1240, 1340. Conversely, the deflected positions of the couplers 1200, 1300 may be one of multiple possible angled deflected positions, where each angled deflected position corresponds to either of the couplers 1200, 1300 forming a different deflected angle relative to the respective axes 1240, 1340. Each of the deflected angles of the couplers 1200, 1300 is greater than the resting angle. As described above and will be described in further detail below, the bidirectional biasing elements 1220, 1320 are configured to provide a spring-loaded deflection of the couplers 1200, 1300, respectively, from one of the deflected positions toward a resting position. Such spring-loaded deflection may occur as a result of a restorative force imparted by each of the bidirectional biasing elements 1220, 1320 upon the elongate bodies 1210, 1310, respectively, where the restorative force biases the elongate bodies 1210, 1310 toward a respective resting position of the couplers 1200, 1300. As will be described in further detail below, such biasing of the elongate bodies 1210, 1310 can decrease the risk of damage to the couplers 1200, 1300 through ordinary course of use, e.g., due to the causes and circumstances described above, as, when the couplers 1200, 1300 are coupled, the bidirectional biasing elements 1220, 1320 can permit spring-loaded deflection of the couplers 1200, 1300 and can further limit axial movement of the couplers 1200, 1300 along the axes 1240, 1340 in a decoupling direction.

The couplers 1200, 1300 differ from the couplers 700, 800 of FIGS. 7-8 in several ways. The couplers 1200, 1300 may, in some embodiments, be smaller than the couplers 700, 800, e.g., due to the couplers 700, 800 being power couplers (e.g., requiring a larger minimum coupler size) and the couplers 1200, 1300 being control couplers (e.g., requiring a smaller minimum coupler size), due to differing contexts of use between the couplers 700,800 and the couplers 1200, 1300, or due to differing sizes of associated connector assemblies and/or connector housings (not depicted).

The differences between the couplers 1200, 1300 and the couplers 700, 800 include structural and functional differences between the bidirectional biasing elements 1220, 1320 and the omnidirectional biasing elements 720, 820. Most notably, the omnidirectional biasing elements 720, 820 comprise a flexible skirt, while the bidirectional biasing elements 1220, 1320 instead comprise bases 1222, 1322 and flanges 1224, 1324. Further, the couplers 1200, 1300 lack a component analogous to the o-rings 750, 850 of the couplers 700, 800. Either or both of these differences can enable the couplers 1200, 1300 to, e.g., occupy a smaller amount of space than the couplers 700, 800, require the manufacture of fewer parts than the couplers 700, 800, and other potential benefits. However, the bidirectional biasing elements 1220, 1320, as described above, provide lesser capacity to bias the elongate bodies 1230, 1330, respectively, than the capacity of the omnidirectional biasing elements 720, 820 to bias the elongate bodies 730, 830. Particularly, the omnidirectional biasing elements 720, 820 permit omnidirectional spring-loaded deflection of the couplers 700, 800, while the bidirectional biasing elements 1220, 1320 merely permit bidirectional spring-loaded deflection of the couplers 1200, 1300. Further, lacking an o-ring similar to the o-rings 750, 850, the couplers 1200, 1300 may not be provided with the functionality the o-rings 750, 850 provide the couplers 700, 800, as described above. However, lacking an analogous component to the o-rings 750, 850, the couplers 1200, 1300 may, e.g., be of smaller size or require an associated housing to have a smaller required volume of interior space. For all of these reasons, choices between the designs of the couplers 700, 800 and the couplers 1200, 1300 (or a mixture of aspects of both sets) may be determined through the contextual needs of a potential coupler.

Figure 14:
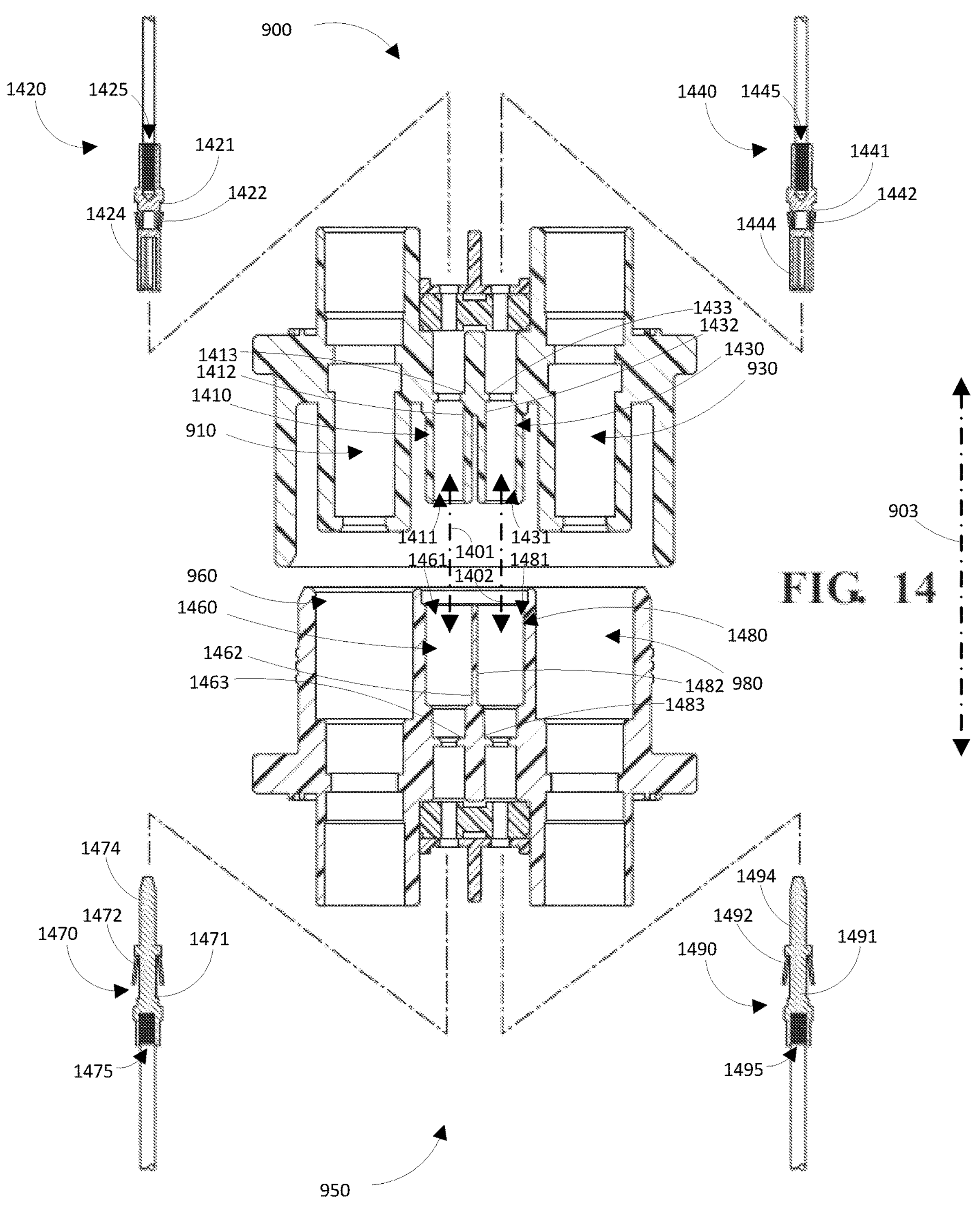
FIG. 14 schematically depicts portions of a socket connector assembly and a plug connector assembly in an exploded view, according to one or more embodiments described herein.

Referring now to FIG. 14, the connector assemblies 900, 950 are depicted in a different embodiment from any of those of FIGS. 9-11. In this embodiment of the connector assemblies 900, 950, the connector assembly 900 comprises, rather than the couplers 920, 940, a first socket coupler 1420 and a second socket coupler 1440, and the connector assembly 950 comprises, rather than the couplers 960, 980, a first plug coupler 1470 and a second plug coupler 1490. The first socket coupler 1420 is secured within, rather than a first socket housing 910, a first socket housing 1410, and the second socket coupler 1440 is secured within, rather than a second socket housing 930, a second socket housing 1430. The first plug coupler 1470 is secured within, rather than the first plug housing 960, a first plug housing 1460, and the second plug coupler 1490 is secured within, rather than the second plug housing 980, a second plug housing 1480.

The couplers 1420, 1440, 1470, 1490 each comprise a respective elongate body 1421, 1441, 1471, 1491, each of the elongate bodies 1421, 1441, 1471, 1491 comprising a respective bidirectional biasing element 1422, 1442, 1472, 1492, wherein each of the bidirectional biasing elements 1422, 1442, 1472, 1492 are structurally similar to the bidirectional biasing elements 1220, 1320 of FIGS. 12-13. The socket couplers 1420, 1440 each have a respective socket 1424, 1444, and the plug couplers 1470, 1490 each have a respective plug 1474, 1494. Each of the couplers 1420, 1440, 1470, 1490 further comprise a respective inner end 1425, 1445, 1475, 1495, and each of the inner ends 1425, 1445, 1475, 1495 may comprise a respective conductor. The respective conductors may be configured to couple, directly or indirectly, the respective coupler 1420, 1440, 1470, 1490 to an electrical interface, and each of the inner ends 1425, 1445, 1475, 1495 may be configured to house the respective conductor of each of the inner ends 1425, 1445, 1475, 1495.

Each of the housings 1410, 1430, 1460, 1480, have a respective first housing space 1411, 1431, 1461, 1481, each of the first housing spaces 1411, 1431, 1461, 1481 having a respective first housing wall 1412, 1432, 1462, 1482, where each first housing wall 1412, 1432, 1462, 1482 extends, in this embodiment, circumferentially about the respective first housing space 1411, 1431, 1461, 1481 (similarly to, for example, the circular shape of the housings 530, 630 of FIGS. 5-6). In other embodiments, any of the housings 1410, 1430, 1460, 1480, the first housing spaces 1411, 1431, 1461, 1481, and/or the first housing walls 1412, 1432, 1462, 1482 may comprise a different shape. Each of the housings 1410, 1430, 1460, 1480 further comprise an inner shoulder 1413, 1433, 1463, 1483. In this embodiment, inner shoulders

1413, 1433, 1463, 1483 define an inner bound of the respective first housing spaces 1411, 1431, 1461, 1481. In this embodiment, a distal end of the housings 1410, 1430, 1460, 1480 define an outer bound of the first housing spaces 1411, 1431, 1461, 1481. The inner shoulders 1413, 1433, 1463, 1483 each further define a respective inner shoulder diameter, and a respective outer end of each of the bidirectional biasing elements 1422, 1442, 1472, 1492 each define a respective outer end diameter. In this embodiment, the outer end diameter of each of the bidirectional biasing elements 1422, 1442, 1472, 1492 is greater than the inner shoulder diameter of each of the corresponding inner shoulders of the inner shoulders 1413, 1433, 1463, 1483. However, in other embodiments, the inner shoulder diameter may be smaller than or equal to the outer end diameter.

The housings 1410, 1460 collectively comprise a first pairing axis 1401, and the housings 1430, 1480 collectively comprise a second pairing axis 1402. The pairing axes 1401, 1402 are parallel to the insertion and removal axis 903. The socket coupler 1420 and the plug coupler 1470 are configured to couple together electrically as a result of relative movement along the first pairing axis 1401, and the socket coupler 1440 and the plug coupler 1490 are configured to couple together electrically as a result of relative movement along the second pairing axis 1402.

The couplers 1420, 1440, 1470, 1490 each have a size and shape configured to correspond to a size and shape of the respective housings 1410, 1430, 1460, 1480. However, as will be described in further detail below and in a manner similar to the relationship between the couplers 920, 940, 970, 990 and the housings 910, 930, 960, 980, the sizes and shapes of the couplers 1420, 1440, 1470, 1490 do not completely occupy the space within the respective housings 1410, 1430, 1460, 1480. The socket housings 1410, 1430 and the plug housings 1460, 1480 comprise, in the embodiment of these figures, certain differences relating to the function of each of the housings 1410, 1430, 1460, 1480. The first housing spaces 1411, 1431 of the socket housings 1410, 1430 comprise, in this embodiment, a smaller volume of space than the first housing spaces 1461, 1481 of the plug housings 1460, 1480. The greater volume of the first housing spaces 1461, 1481 may enable the plug couplers 1470, 1490 to occupy a wider array of spring-loaded deflected positions when compared to the socket couplers 1420, 1440. However, in other embodiments, the first housing spaces 1411, 1431, 1461, 1481 may all have the same volume of space, or, in other embodiments, the first housing spaces 1411, 1431 may occupy a greater volume of space than the first housing spaces 1461, 1481.

Notably, the embodiment of the connector assemblies 900, 950 depicted in FIGS. 9-11, the couplers 1420, 1440, 1470, 1490 occupy the housings 1410, 1430, 1460, 1480, rather than the housings 910, 930, 960, 980. The housings 910, 930, 960, 980 are larger than the housings 1410, 1430, 1460, 1480, and, as a result, the couplers 1420, 1440, 1470, 1490 are sized and configured differently than the couplers 920, 940, 970, 990. Particularly, in this embodiment, the couplers 1420, 1440, 1470, 1490 are configured to have a smaller size than the couplers 920, 940, 970, 990. However, while couplers having a design similar to the couplers 1420, 1440, 1470, 1490 may be sized and configured to instead occupy larger housings, such as the housings 910, 930, 960, 980, they may instead be sized and configured to occupy smaller housings, such as the housings 1410, 1430, 1460, 1480. Several factors can warrant variances in these designs, including, e.g., differences in intended function within the connector assemblies 900, 950. For example, the connector assemblies 900, 950 could comprise each and all of the couplers 920, 940, 970, 990, 1420, 1440, 1470, 1490 and, e.g., use the couplers 920, 940, 970, 990 as power couplers, as described above, and use the couplers 1420, 1440, 1470, 1490 as control couplers, as described above. In those embodiments, differences between the couplers 920, 940, 970, 990 and the couplers 1420, 1440, 1470, 1490 may be to, e.g., provide space efficiency by limiting coupler size to only be as large as necessary for a coupler's given purpose or to, e.g., permit a greater number of a certain type of couplers given a certain size constraint (e.g., a greater number of control couplers). Alternatively, different embodiments of the connector assemblies 900, 950 may use differing numbers of power and control couplers, or may only use one type of coupler or the other.

Figures 15A, 15B:
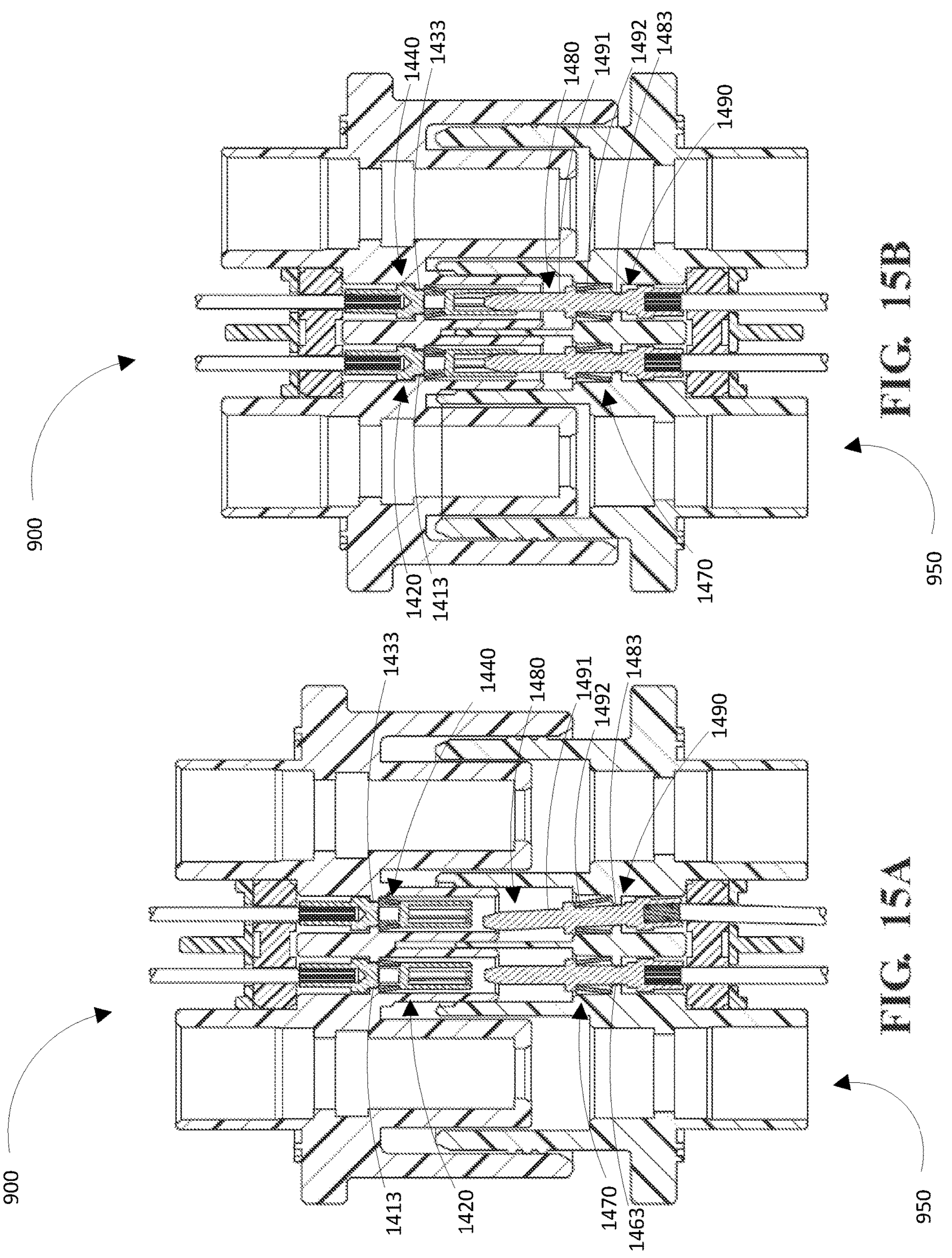
FIGS. 15A-B schematically depict the connector assemblies of FIG. 14 in a first exemplary context while coupling, where a plug coupler is in a spring-loaded deflected position, according to one or more embodiments described herein.

Referring now to FIGS. 15A-B, a coupling of the connector assemblies 900, 950 is depicted in a third exemplary context. The couplers 1420, 1440, 1470, 1490 are now depicted within their respective connector assemblies of the connector assemblies 900, 950. In the depiction of these figures, the bidirectional biasing elements 1422, 1442, 1472, 1492 are depicted limiting axial movement of the respective couplers 1420, 1440, 1470, 1490 relative to the respective housings 1410, 1430, 1460, 1480 in a decoupling direction along the respective pairing axes 1401, 1402 by, e.g., an outer end of each of the bidirectional biasing elements 1422, 1442, 1472, 1492 contacting the respective inner shoulders 1413, 1433, 1463, 1483 and thereby prohibiting movement beyond the outer ends of the respective bidirectional biasing elements 1422, 1442, 1472, 1492.

FIG. 15A depicts the connector assemblies 900, 950 having moved in a coupling direction relative to the positions of the connector assemblies 900, 950 in FIG. 14. FIG. 15A depicts the second plug coupler 1490 in a spring-loaded deflected position. In this spring-loaded deflected position, and due to either or both of the contact of the bidirectional biasing element 1492 with the inner shoulder 1483 or the first housing wall 1482, the bidirectional biasing element 1492 permits bidirectional spring-loaded deflection of the second plug coupler 1490 because, e.g., the bidirectional biasing element 1492 is configured to function as a spring when pressed against external surfaces (e.g., components of the connector assemblies 1400, 1450) and thereby deflect the elongate body 1491 from the external surface. In the example of FIG. 15A, the bidirectional biasing element 1492 imparts upon the elongate body 1491 a restorative force, wherein the restorative force biases the second plug coupler 1490 toward a resting position of the second plug coupler 1490. As depicted in FIG. 15B, the restorative force results in the proper coupling of the second plug coupler 1490 and the second socket coupler 1440. However, it should be appreciated that, while such biasing of a coupler may be necessary in certain circumstances to properly couple two couplers, such as the couplers 1440, 1490 in FIGS. 15A-B, in other circumstances such biasing of a coupler may not be necessary to properly couple two couplers, such as the couplers 1420, 1470 in FIGS. 15A-B.

Due to the size and configuration of the bidirectional biasing element 1492 when compared to, e.g., the size and configuration of the omnidirectional biasing element 992 as depicted in FIG. 10A, the bidirectional biasing element 1492 may provide a less powerful restorative force to the elongate body 1491 than the bidirectional biasing element 992 provides to the elongate body 991 in FIG. 10A. Further, the flanged configuration of the bidirectional biasing element 1492, rather than the skirt configuration of the bidirectional biasing element 992, may result in a comparatively lesser range of spring-loaded deflected positions that the second plug coupler 1490 can occupy compared to the second plug coupler 990. As flanges of the bidirectional biasing element 1492 do not entirely surround the elongate body 1491, as opposed to, e.g., the bidirectional biasing element 992 relative to the elongate body 991, there may be a greater number of deflected positions that are not spring-loaded deflected positions that the second plug coupler 1490 can occupy (i.e., a deflected position where the bidirectional biasing element 1492 is not imparting a restorative force biasing the second plug coupler 1490 toward a resting position of the second plug coupler 1490) when compared to, e.g., the number of deflected positions that are not spring-loaded deflected positions that the second plug coupler 990 can occupy (in embodiments where such exist, as, in some embodiments, all deflected positions of the second plug coupler 990 are spring-loaded deflected positions).

Figure 16:
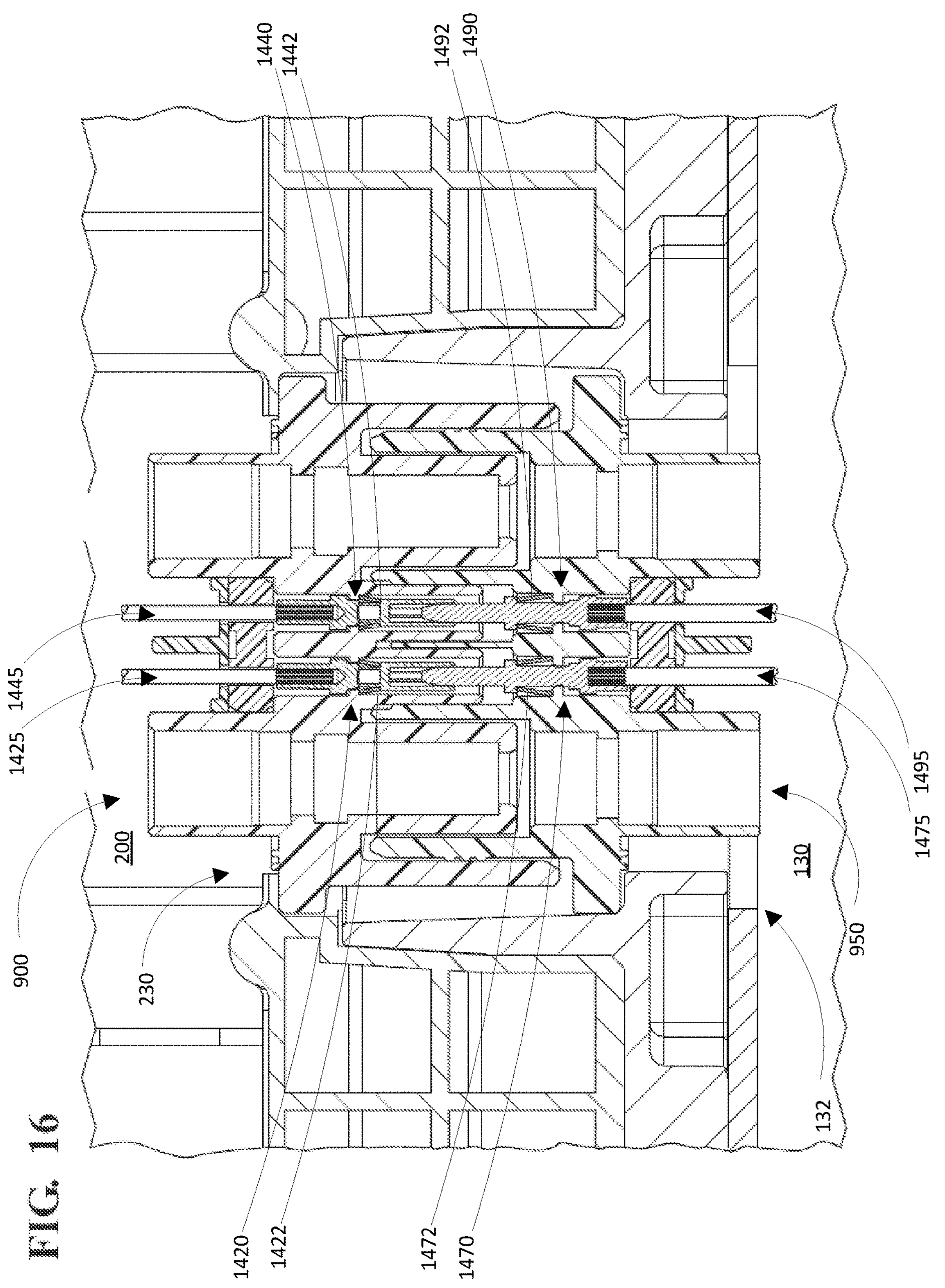
FIG. 16 schematically depicts the connector assemblies of FIG. 15 coupled together in a second exemplary context, according to one or more embodiments described herein.

Referring now to FIG. 16, a coupling of the connector assemblies 900, 950 is depicted in a fourth exemplary context. In the embodiment of FIG. 16, the socket connector assembly 900 is electrically coupled to and physically affixed to the bottom side 230 of the removable battery assembly 200 of FIG. 4A, while the plug connector assembly 950 is electrically coupled to and physically affixed to the upward-facing side 132 of the receiving space 130 of the materials handling vehicle 100. In this embodiment, the connector assemblies 900, 950 are coupled together, and conductors, housed in the inner ends 1425, 1445, 1475, 1495, are electrically coupled to respective ones of the couplers 1420, 1440, 1470, 1490 and, either directly or by proxy, electrically coupled to a respective one of the materials handling vehicle 100 and/or the removable battery assembly 200.

In this exemplary context, due to, e.g., the presence of the bidirectional biasing elements 1422, 1442, 1472, 1492 and/or the capacity of the couplers 1420, 1440, 1470, 1490 to occupy spring-loaded deflected positions, the couplers 1420, 1440, 1470, 1490 may have a decreased risk of improper coupling, damage to the couplers, or other harmful effects, and, similarly, the connector assemblies 900, 950 and, as a result, the materials handling vehicle 100 and the removable battery assembly 200 may have an improved electrical coupling than if, e.g., the above-listed components and capacities or other components or capacities described herein were omitted from the connector assemblies 900, 950.

The embodiments depicted in FIGS. 11 and 16 are not mutually exclusive, and some embodiments may comprise all or some of the features and components of the connector assemblies 900, 950 depicted in both FIGS. 11 and 16. In those embodiments, the couplers 1420, 1440, 1470, 1490 function as control couplers while the couplers 920, 940, 970, 990 function as power couplers. Further, in any such embodiments or in additional embodiments, there may be further amounts of couplers of either or both of the couplers 920, 940, 970, 990 and/or the couplers 1420, 1440, 1470, 1490 not depicted due to the renderings of FIGS. 11 and 16 as two-dimensional schematic views. Such additional couplers may occupy three-dimensional positions similar to the configurations and designs of the connector assemblies 140, 240 in FIGS. 4A-5 or of the connector assemblies 500, 600 of FIGS. 5-6, and additional couplers may also occupy further configurations not disclosed herein.

Figure 17:
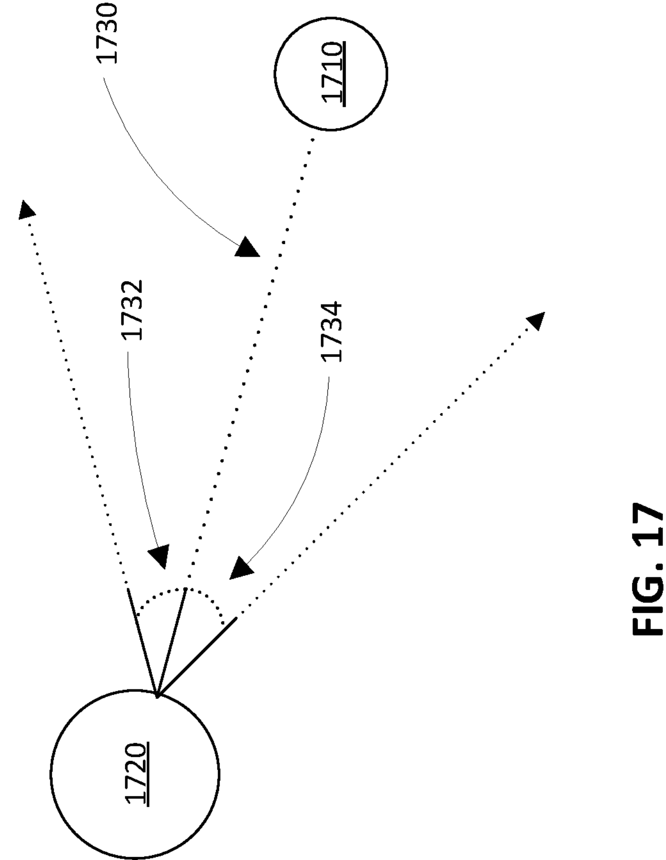
FIG. 17 schematically depicts an overhead view of an element in a deflected position, an axis, a vector between the element and the axis, and angles defining what further vectors may be substantially aligned with the vector, according to one or more embodiments described herein.

Referring to FIG. 17, it is noted that recitations herein describe, particularly with reference to FIGS. 7-8 (when describing omnidirectional spring-loaded deflection) and 12-13 (when describing bidirectional spring-loaded deflection), the capacity of an element to permit a spring-loaded deflective force directed toward a pairing axis of the deflected element at an angle substantially aligned with a radial vector extending from the axis to the deflected element. FIG. 17 depicts an example of such vectors. FIG. 17 depicts an overhead view of an element 1720 in a deflected position away from an axis 1710 (e.g., an axis of a resting position of the element 1720). A vector 1730 extends from the axis 1710 to the element 1720. As such, a spring-loaded deflective force imparted upon the element 1720 and directed from the element 1720 toward the axis 1710 along the vector 1730 would be, as described above, directed toward a pairing axis (e.g., the axis 1710) of a deflected element (e.g., the element 1720) at an angle aligned with a radial vector (e.g., the vector 1730) extending from the axis to the deflected element. Similarly, a spring-loaded deflective force imparted upon the element 1720 and directed from the element 1720 toward the axis 1710 at an angle relative to the vector 1730 could be substantially aligned with the vector 1730 if the angle relative to the vector 1730 is within the bounds of an angle 1732 and an angle 1734. As such, the angles 1732, 1734 define what vectors, extending from the element 1720 (and corresponding to, e.g., the direction of a spring-loaded deflective force), may be considered "substantially aligned" with the vector 1730.

In some embodiments, a force imparted upon the element 1720 and directed toward the axis 1710 is "substantially aligned" with the vector 1730 if the force is directed from the element 1720 along a vector within a 30 degree threshold relative to the vector 1730 (i.e., wherein the force vector is within the angles 1732, 1734 and wherein each of the angles 1732, 1734 is equal to 30). In other embodiments, a force imparted upon the element 1720 and directed toward the axis 1710 may only be "substantially aligned" with the vector 1730 if the force is directed within a narrower range of angles. For example, the angles 1732, 1734 (and the associated bounds of what angles are included in being "substantially aligned" with the vector 1730) may instead be equal to, in some embodiments, 25 degrees. In other embodiments, the angles 1732, 1734 (and the associated bounds of what angles are included in being "substantially aligned" with the vector 1730) may instead be equal to any other value less than 30 degrees.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "about" and "approximately" are utilized herein to represent the inherent degree of uncertainty that may be attributed to any quantitative comparison, value, measurement, or other representation. The terms "about" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A materials handling vehicle comprising a materials handling mechanism, a drive mechanism, a battery receiving space, and a removable battery assembly, wherein:

the materials handling mechanism is configured to engage goods in a warehouse environment and cooperates with the drive mechanism, under power from the removable battery assembly, to move goods along an inventory transit surface in the warehouse environment;

the removable battery assembly and the battery receiving space cooperate to define a battery insertion and removal axis along which the removable battery assembly is inserted into and removed from the battery receiving space;

the removable battery assembly comprises a battery-side connector assembly;

the battery receiving space comprises a vehicle-side connector assembly;

the battery-side connector assembly and the vehicle-side connector assembly are configured to electrically couple the removable battery assembly and an electrical system of the materials handling vehicle;

the battery-side connector assembly and the vehicle-side connector assembly each comprises a connector housing and an electrical coupler corresponding to and secured within the connector housing;

the respective electrical coupler of the battery-side connector assembly and the respective electrical coupler of the vehicle-side connector assembly are configured to couple together electrically as a result of relative movement along a coupler pairing axis that is parallel to the battery insertion and removal axis;

at least one of the electrical coupler of the battery-side connector assembly or the electrical coupler of the vehicle-side connector assembly, or both, is an omnidirectional biasing coupler, wherein the omnidirectional biasing coupler comprises an omnidirectional biasing element;

the omnidirectional biasing element secures the omnidirectional biasing coupler against the respective connector housing of the battery-side connector assembly or the vehicle-side connector assembly to:

limit axial movement of the omnidirectional biasing coupler relative to the respective connector housing of the battery-side connector assembly or the vehicle-side connector assembly in a decoupling direction along the pairing axis, and permit omnidirectional spring-loaded deflection of the omnidirectional biasing coupler between a resting position and a spring-loaded deflected position; and the connector housing of the battery-side connector assembly or the vehicle-side connector assembly insertably engages the connector housing of the other of the battery-side connector assembly or the vehicle-side connector assembly.

2. The materials handling vehicle of claim 1, wherein:

the resting position forms a resting angle between the pairing axis and the omnidirectional biasing coupler; and the spring-loaded deflected position is one of a plurality of angled spring-loaded deflected positions, wherein:

each of the angled spring-loaded deflected positions forms one of a plurality of deflected angles between the pairing axis and the battery-side electrical coupler, the vehicle-side electrical coupler, or both, and each deflected angle of the plurality of deflected angles is greater than the resting angle.

3. The materials handling vehicle of claim 1, wherein the omnidirectional biasing element is a flexible skirt.

4. The materials handling vehicle of claim 1, wherein:

the omnidirectional biasing element is disposed around a circumference of an elongate body of the omnidirectional biasing coupler; and the omnidirectional biasing element extends outwardly to an outer end.

5. The materials handling vehicle of claim 4, wherein:

the respective housing of the omnidirectional biasing coupler comprises a housing space, the housing space comprising a housing wall;

when the omnidirectional biasing coupler is in the spring-loaded deflected position, the outer end is configured to, when in contact with the housing wall, impart upon the omnidirectional biasing coupler a restorative force, wherein the restorative force biases the omnidirectional biasing coupler toward the resting position of the omnidirectional biasing coupler.

6. The materials handling vehicle of claim 4, wherein:

the respective housing of the omnidirectional biasing coupler comprises a housing space, the housing space comprising a housing wall;

the housing wall comprises an inner shoulder; and the outer end of the omnidirectional biasing element is configured to limit axial movement of the omnidirectional biasing coupler relative to the respective housing of the omnidirectional biasing coupler in a decoupling direction along the pairing axis by contacting the inner shoulder.

7. The materials handling vehicle of claim 6, wherein:

the inner shoulder of the housing wall defines a shoulder diameter;

the outer end of the omnidirectional biasing element defines an outer end diameter; and the outer end diameter is greater than or equal to the shoulder diameter.

8. The materials handling vehicle of claim 4, wherein:

the electrical coupler of the vehicle-side connector assembly is a plug coupler;

the electrical coupler of the battery-side connector assembly is a socket coupler;

the socket coupler is configured to receive the plug coupler.

9. The materials handling vehicle of claim 4, wherein the outer end of the omnidirectional biasing element extends continuously about the circumference of the elongate body of the omnidirectional biasing coupler.

10. The materials handling vehicle of claim 4, wherein the outer end extends discontinuously about the circumference of the elongate body.

11. The materials handling vehicle of claim 1, wherein:

at least one of the electrical coupler of the vehicle-side connector assembly and the electrical coupler of the battery-side connector assembly is a plug coupler;

at least one of the electrical coupler of the vehicle-side connector assembly and the electrical coupler of the battery-side connector assembly is a socket coupler;

the connector housing of the battery-side connector assembly or the connector housing of the vehicle-side connector assembly comprises a housing space, the housing space comprising a housing wall;

the housing wall comprises an outer lip, the outer lip extending around a distal end of a socket of the socket coupler; and the outer lip is configured to guide a corresponding one of the electrical couplers into the socket.

12. The materials handling vehicle of claim 1, wherein:

the battery-side connector assembly comprises a plurality of battery-side electrical couplers;

the vehicle-side connector assembly comprises a plurality of vehicle-side electrical couplers;

each of the battery-side electrical couplers corresponds to a corresponding vehicle-side electrical coupler of the plurality of vehicle-side electrical couplers, each battery-side electrical coupler and corresponding vehicle-side electrical coupler forming a coupler pair; and each coupler pair is configured to couple along a respective pairing axis that is parallel to the battery insertion and removal axis.

13. The materials handling vehicle of claim 1, wherein:

the omnidirectional biasing coupler comprises an elongate body;

the omnidirectional biasing coupler comprises a flexible o-ring disposed about the elongate body.

14. The materials handling vehicle of claim 13, wherein:

the respective connector housing of the battery-side connector assembly or the vehicle-side connector assembly comprises a housing space, the housing space comprising a housing wall;

the flexible o-ring is configured to, when in contact with the housing wall, provide a frictional force that limits axial movement of the omnidirectional biasing coupler relative to the respective connector housing of the battery-side connector assembly or the vehicle-side connector assembly in a decoupling direction along the pairing axis.

15. The materials handling vehicle of claim 13, wherein:

the elongate body comprises a ring-housing groove; and the ring-housing groove houses the flexible o-ring.

16. The materials handling vehicle of claim 13, wherein:

the respective connector housing of the battery-side connector assembly or the vehicle-side connector assembly comprises a housing space, the housing space comprising a housing wall; and the flexible o-ring creates a seal between the elongate body and the housing wall.

17. The materials handling vehicle of claim 1, wherein the omnidirectional biasing coupler is a power coupler.

18. The materials handling vehicle of claim 1, wherein the omnidirectional biasing coupler is a control coupler.

19. The materials handling vehicle of claim 1, wherein:

the battery-side connector assembly comprises a battery-side omnidirectional biasing element;

the battery-side omnidirectional biasing element secures the electrical coupler of the battery-side connector assembly to the connector housing of the battery-side connector assembly to:

limit axial movement of the electrical coupler of the battery-side connector assembly relative to the connector housing of the battery-side connector assembly in a decoupling direction along the pairing axis, and permit omnidirectional spring-loaded deflection of the electrical coupler of the battery-side connector assembly between a battery-side resting position and a spring-loaded battery-side deflected position;

the vehicle-side connector assembly comprises a vehicle-side omnidirectional biasing element;

the vehicle-side omnidirectional biasing element secures the electrical coupler of the vehicle-side connector assembly to the connector housing of the vehicle-side connector assembly to:

limit axial movement of the electrical coupler of the vehicle-side connector assembly relative to the connector housing of the vehicle-side connector assembly in a decoupling direction along the pairing axis, and permit omnidirectional spring-loaded deflection of the electrical coupler of the vehicle-side connector assembly between a vehicle-side resting position and a spring-loaded vehicle-side deflected position.

20. The materials handling vehicle of claim 19, wherein:

the battery-side resting position forms a battery-side resting angle between the pairing axis and the electrical coupler of the battery-side connector assembly; and the spring-loaded battery-side deflected position is one of a plurality of angled spring-loaded battery-side deflected positions, wherein:

each of the angled spring-loaded battery-side deflected positions forms one of a plurality of battery-side deflected angles between the pairing axis and the electrical coupler of the battery-side connector assembly, and each battery-side deflected angle of the plurality of battery-side deflected angles is greater than the battery-side resting angle.

21. The materials handling vehicle of claim 19, wherein:

the vehicle-side resting position forms a vehicle-side resting angle between the pairing axis and the electrical coupler of the vehicle-side connector assembly; and the spring-loaded vehicle-side deflected position is one of a plurality of angled spring-loaded vehicle-side deflected positions, wherein:

each of the angled spring-loaded vehicle-side deflected positions forms one of a plurality of vehicle-side deflected angles between the pairing axis and the electrical coupler of the vehicle-side connector assembly, and each vehicle-side deflected angle of the plurality of vehicle-side deflected angles is greater than the vehicle-side resting angle.

22. The materials handling vehicle of claim 1, wherein permitting omnidirectional spring-loaded deflection of the omnidirectional biasing coupler between the resting position and the spring-loaded deflected position comprises permitting a spring-loaded deflective force directed toward the pairing axis at a deflective angle substantially aligned with a radial angle of the resting position relative to the pairing axis, wherein the radial angle is any radial angle relative to the pairing axis.

23. The materials handling vehicle of claim 22, the deflective angle is an angle within 30 degrees of the radial angle of the resting position.

24. A materials handling vehicle comprising a materials handling mechanism, a drive mechanism, a battery receiving space, and a removable battery assembly, wherein:

the materials handling mechanism is configured to engage goods in a warehouse environment and cooperates with the drive mechanism, under power from the removable battery assembly, to move goods along an inventory transit surface in the warehouse environment;

the removable battery assembly and the battery receiving space cooperate to define a battery insertion and removal axis along which the removable battery assembly is inserted into and removed from the battery receiving space;

the removable battery assembly comprises a battery-side connector assembly;

the battery receiving space comprises a vehicle-side connector assembly;

the battery-side connector assembly and the vehicle-side connector assembly are configured to electrically couple the removable battery assembly and an electrical system of the materials handling vehicle;

the battery-side connector assembly and the vehicle-side connector assembly each comprises a connector housing and an electrical coupler corresponding to and secured within the connector housing;

the respective electrical coupler of the battery-side connector assembly and the respective electrical coupler of the vehicle-side connector assembly are configured to couple together electrically as a result of relative movement along a coupler pairing axis that is parallel to the battery insertion and removal axis;

at least one of the electrical coupler of the battery-side connector assembly or the electrical coupler of the vehicle-side connector assembly, or both, is a bidirectional biasing coupler, wherein the bidirectional biasing coupler comprises a bidirectional biasing element;

the bidirectional biasing element secures the bidirectional biasing coupler against the respective connector housing of the battery-side connector assembly or the vehicle-side connector assembly to:

limit axial movement of the bidirectional biasing coupler relative to the respective connector housing of the battery-side connector assembly or the vehicle-side connector assembly in a decoupling direction along the pairing axis, and permit bidirectional spring-loaded deflection of the bidirectional biasing coupler between a resting position and a spring-loaded deflected position; and the connector housing of the battery-side connector assembly or the vehicle-side connector assembly insertably engages the connector housing of the other of the battery-side connector assembly or the vehicle-side connector assembly.

* * * * *